US012573325B2

(12) United States Patent
Liu et al.

(10) Patent No.: US 12,573,325 B2
(45) Date of Patent: Mar. 10, 2026

(54) SCAN SIGNAL DRIVER CIRCUIT, DISPLAY PANEL, DISPLAY DEVICE, AND DRIVING METHOD

(71) Applicant: Hubei Yangtze Industrial Innovation Center Of Advanced Display Co., Ltd., Wuhan (CN)

(72) Inventors: Xigang Liu, Wuhan (CN); Lu Tang, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 3 days.

(21) Appl. No.: 18/586,820

(22) Filed: Feb. 26, 2024

(65) Prior Publication Data

US 2024/0194107 A1      Jun. 13, 2024

(30) Foreign Application Priority Data

Aug. 25, 2023    (CN) .......................... 202311083738.4

(51) Int. Cl.
*G09G 3/20* (2006.01)
*G06F 3/044* (2006.01)
(52) U.S. Cl.
CPC .............. *G09G 3/20* (2013.01); *G06F 3/044* (2013.01); *G09G 2310/0267* (2013.01); *G09G 2310/0286* (2013.01); *G09G 2310/08* (2013.01); *G09G 2354/00* (2013.01)
(58) Field of Classification Search
None
See application file for complete search history.

(56) References Cited

U.S. PATENT DOCUMENTS

| | | | | |
|---|---|---|---|---|
| 10,031,614 B2* | 7/2018 | Sung | .................... | G06F 3/04166 |
| 2012/0262387 A1* | 10/2012 | Mizuhashi | ............ | G06F 3/0446 |
| | | | | 345/173 |
| 2013/0241814 A1* | 9/2013 | Hirabayashi | .......... | G06F 3/0412 |
| | | | | 345/100 |
| 2014/0184533 A1* | 7/2014 | Park | .................... | G06F 3/04184 |
| | | | | 345/173 |
| 2014/0267156 A1* | 9/2014 | Koga | .................... | G06F 3/0412 |
| | | | | 345/174 |

(Continued)

FOREIGN PATENT DOCUMENTS

CN            112150953        12/2020

*Primary Examiner* — Lunyi Lao
*Assistant Examiner* — Sarvesh J Nadkarni
(74) *Attorney, Agent, or Firm* — KDW FIRM PLLC

(57) ABSTRACT

The present disclosure relates to a scan signal driver circuit. The scan signal driver circuit includes: a scan signal drive module, where a clock signal input terminal of the scan signal drive module is coupled to a clock signal line; and a gating module, where the gating module includes a control terminal, a first input terminal, a second input terminal, and an output terminal, the control terminal receives a control signal, the first input terminal receives a clock signal, the second input terminal receives a touch electrode drive signal, and the output terminal is connected to the clock signal line; in a touch stage of a frame time of the display panel, the control signal instructs the output terminal to be coupled to the second input terminal such that the clock signal line receives the touch electrode drive signal.

24 Claims, 14 Drawing Sheets

(56)　　　　　　　　References Cited

U.S. PATENT DOCUMENTS

| | | | |
|---|---|---|---|
| 2016/0188091 A1 * | 6/2016 | Sun | G06F 3/04184 |
| | | | 345/174 |
| 2016/0259455 A1 * | 9/2016 | Li | G11C 19/00 |
| 2016/0334908 A1 * | 11/2016 | Zhuang | G06F 3/0412 |
| 2017/0153742 A1 * | 6/2017 | Pang | G06F 3/04166 |
| 2019/0279600 A1 * | 9/2019 | Chan | G06F 3/04166 |
| 2021/0373697 A1 * | 12/2021 | Fukushima | G06F 3/0412 |
| 2023/0214037 A1 * | 7/2023 | Hwang | G06F 3/04184 |
| | | | 345/174 |
| 2023/0367410 A1 * | 11/2023 | Kim | G09G 3/3677 |

* cited by examiner

Clock signal

Control signal 230

231

23

T1

233 22

Scan signal drive module 21

T2

232

Touch electrode drive signal

20

Control signal

First clock signal

Second clock signal

230 First gating module 23 233 22

231

232

230 Second gating module 23

231

233 22

232

Scan signal drive module 21

20

Touch electrode drive signal

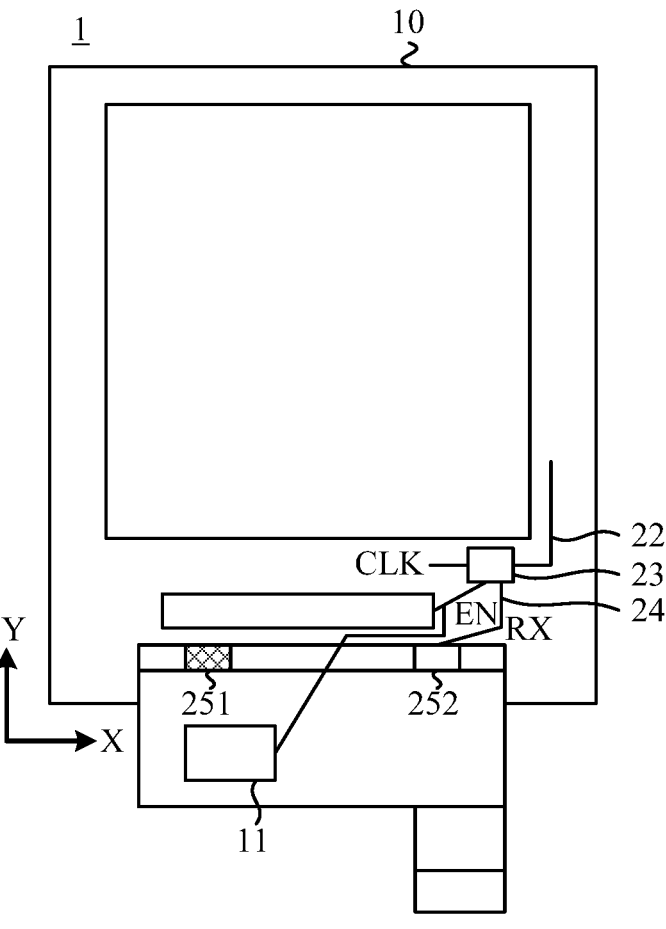

FIG. 25

In a touch stage, receiving a control signal by a control terminal of a gating module, wherein the control signal is used for instructing an output terminal of the gating module to be coupled to a second input terminal of the gating module; and outputting a touch electrode drive signal by the output terminal of the gating module to a clock signal line such that the clock signal line receives the touch electrode drive signal     ∽ S50

FIG. 26

In a display stage, receiving a control signal by a control terminal of a gating module, wherein the control signal is used for instructing the output terminal of the gating module to be coupled to a first input terminal of the gating module; and outputting a clock signal by the output terminal to the clock signal line such that the clock signal line receives the clock signal     ∽ S60

FIG. 27

SCAN SIGNAL DRIVER CIRCUIT, DISPLAY PANEL, DISPLAY DEVICE, AND DRIVING METHOD

CROSS-REFERENCE TO RELATED APPLICATION(S)

This application claims priority to Chinese Patent Application No. 202311083738.4 filed on Aug. 25, 2023, the disclosure of which is incorporated herein by reference in its entirety.

TECHNICAL FIELD

The present disclosure relates to the field of display technology and, in particular, to a scan signal driver circuit, a display panel, a display device, and a driving method.

BACKGROUND

With the development of display technology, touch display technology has been gradually applied to display devices such as mobile phones. The touch control display panel using the touch control display technology has both display and position touch detection functions, is convenient to use, and has a good human-computer communication experience.

In the related art, the touch display panel includes a touch wire and a clock signal line in the non-display region to transmit a touch electrode drive signal and a clock signal, respectively. The touch control wire and the clock signal line are separated by an electrode layer of a light-emitting element. When a hollowed-out region is present in the electrode layer, the touch control signal is affected by the clock signal because the touch control wire and the clock signal line are directly overlapped and coupled, thereby causing poor touch accuracy.

SUMMARY

The present disclosure provides a scan signal driver circuit, a display panel, a display device, and a driving method.

In a first aspect, the present disclosure provides a scan signal driver circuit. The scan signal driver circuit is located in a non-display region of a display panel and includes a scan signal drive module and a gating module.

A clock signal input terminal of the scan signal drive module is coupled to a clock signal line.

The gating module includes a control terminal, a first input terminal, a second input terminal, and an output terminal, the control terminal is configured to receive a control signal, the first input terminal is configured to receive a clock signal, the second input terminal is configured to receive a touch electrode drive signal, and the output terminal is connected to the clock signal line.

A frame time of the display panel includes a display stage and a touch stage. In the touch stage, the control signal received by the control terminal of the gating module is used for instructing the output terminal of the gating module to be coupled to the second input terminal of the gating module, the output terminal of the gating module is configured to output the touch electrode drive signal to the clock signal line.

In a second aspect, the present disclosure further provides a display panel. The display panel includes a display region and a non-display region at least partially surrounding the display region. The display panel includes a touch electrode signal line, a clock signal line, and a gating module in the non-display region.

The gating module includes a control terminal, a first input terminal, a second input terminal, and an output terminal, the control terminal is configured to receive a control signal, the first input terminal is configured to receive a clock signal, the second input terminal is coupled to the touch electrode signal line to receive a touch electrode drive signal, and the output terminal is coupled to the clock signal line.

A frame time of the display panel includes a display stage and a touch stage. In the touch stage, the control signal received by the control terminal of the gating module is used for instructing the output terminal of the gating module to be coupled to the second input terminal of the gating module, the output terminal of the gating module is configured to output the touch electrode drive signal to the clock signal line.

In a third aspect, the present disclosure further provides a display device. The display device includes the preceding display panel.

In a fourth aspect, the present disclosure further provides a driving method. The driving method is implemented based on a gating module, wherein the gating module includes a control terminal, a first input terminal, a second input terminal, and an output terminal, the control terminal is configured to receive a control signal, the first input terminal is configured to receive a clock signal, the second input terminal is configured to receive a touch electrode drive signal, and the output terminal is connected to a clock signal line and the driving method includes the following step.

In a touch stage, receiving the control signal by the control terminal of the gating module, where the control signal is used for instructing the output terminal of the gating module to be coupled to the second input terminal of the gating module; and outputting the touch electrode drive signal, by the output terminal of the gating module, to the clock signal line.

BRIEF DESCRIPTION OF DRAWINGS

The drawings, which are incorporated in and constitute a part of the specification, illustrate embodiments in accordance with the present disclosure and together with the specification, serve to explain the principles of the present disclosure.

To illustrate the solutions in the embodiments of the present disclosure or the solutions in the related art more clearly, the drawings used in the description of the embodiments or the related art will be briefly described below. Apparently, the drawings described below illustrate only part of the embodiments of the present disclosure, and those of ordinary skill in the art may obtain other drawings based on the drawings described below on the premise that no creative work is done.

FIG. 25 is a structure diagram of another display device provided by an embodiment of the present disclosure;

FIG. 26 is a flowchart of a driving method provided by an embodiment of the present disclosure; and FIG. 27 is a flowchart of another driving method provided by an embodiment of the present disclosure.

DETAILED DESCRIPTION

For a clearer understanding of the objects, features, and advantages of the present disclosure, the solutions of the present disclosure are further described hereinafter. It is to be noted that if not in collision, the embodiments and features therein in the present disclosure may be combined with each other.

While numerous specific details are set forth in the following description in order to provide a thorough understanding of the present disclosure, the present disclosure may also be implemented in other ways than those described herein. Apparently, the embodiments described in the specification are just a part but not all of the embodiments of the present disclosure.

In the scan signal driver circuit, the display panel, the display device, and the driving method provided by the embodiments of the present disclosure, by setting a gating module and coupling the output terminal of the gating module to the second input terminal of the gating module in the touch stage, the clock signal line can receive the touch electrode drive signal, that is, the clock signal line and the touch wire can synchronously transmit the touch electrode drive signal, thereby avoiding the coupling interference of the clock signal to the touch electrode drive signal and improving touch accuracy.

Exemplary descriptions are provided below in conjunction with the drawings.

Figure 1:
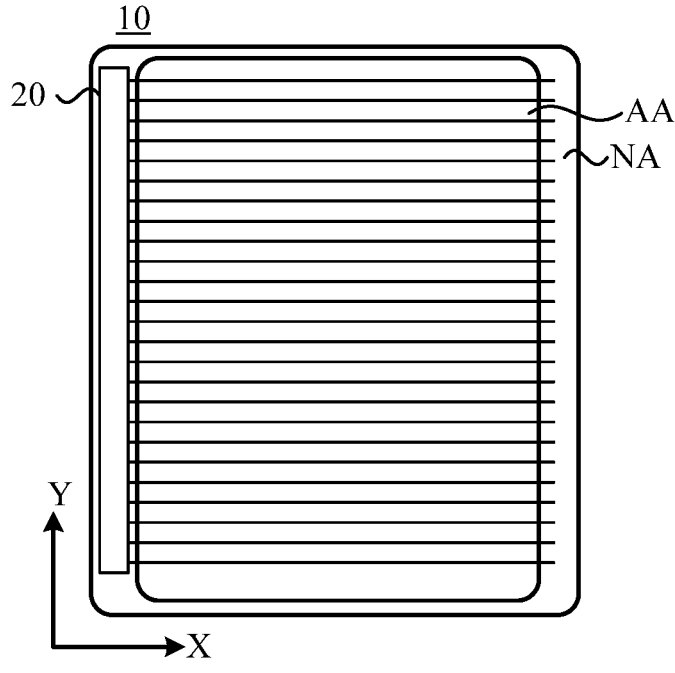
FIG. 1 is a structure diagram of a display panel provided by an embodiment of the present disclosure.
Figure 2:
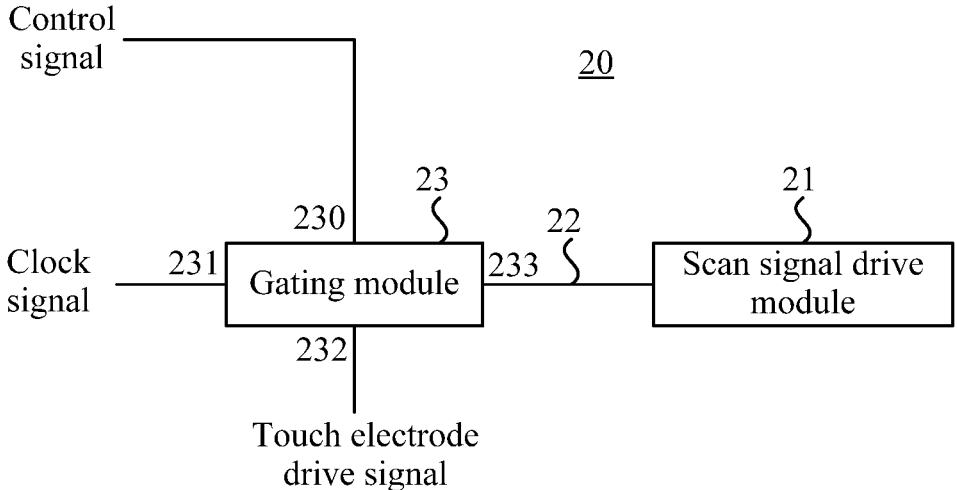
FIG. 2 is a structure diagram of a scan signal driver circuit provided by an embodiment of the present disclosure.

Illustratively, FIG. 1 is a structure diagram of a display panel provided by an embodiment of the present disclosure, and FIG. 2 is a structure diagram of a scan signal driver circuit provided by an embodiment of the present disclosure. As shown in FIGS. 1 and 2, the display panel 10 may include a display region AA and a non-display region NA at least partially surrounding the display region AA. A scan signal drive module 20 is located in the non-display region NA of the display panel 10. The scan signal driver circuit 20 may include a scan signal drive module 21 and a gating module 23. A clock signal input terminal of the scan signal drive module 21 is coupled to a clock signal line 22. The gating module 23 includes a control terminal 230, a first input terminal 231, a second input terminal 232, and an output terminal 233, the control terminal 230 is configured to receive a control signal, the first input terminal 231 is configured to receive a clock signal, the second input terminal 232 is configured to receive a touch electrode drive signal, and the output terminal 233 is connected to the clock signal line.

The display region AA is used for display images and may further include sub-pixels arranged in an array, and each sub-pixel includes a pixel driver circuit and a light-emitting element to achieve active light emission control and further achieve image display. The non-display region NA may at least partially surround the display region AA. For example, the non-display region NA may be disposed in at least part of a space on at least one side of the display region AA and is used for arranging peripheral circuits and wires to transmit signals for display such as drive signals and power signals to the display region AA. Illustratively, the peripheral circuits may include the scan signal driver circuit 20, and the wires may include the clock signal line 22, a touch electrode signal line, and other wires. The non-display region NA is not used for display images and may also be referred to as a bezel region. The smaller the proportion of the area of the non-display region NA in the plane area of the display panel 10, the higher the proportion of the display region AA, and the more easily the narrow bezel full-screen display is achieved.

Illustratively, the scan signal driver circuit 20 may be located in the non-display region NA on at least one side of the display panel 10. For example, in the display panel 10 shown in FIG. 1, with the orientation shown in FIG. 1 as an example, the scan signal driver circuit 20 may be located in the non-display region NA on the left side of the display region AA; in other implementations, the scan signal driver circuit 20 may also be located in the non-display region NA on both the left and right sides of the display panel 10, which is not limited thereto.

The scan signal driver circuit 20 may output stage by stage scan signals that are provided for the sub-pixels and may include a scan signal drive module 21, a gating module 23, and a clock signal line 22 connected therebetween. The gating module 23 includes a control terminal 230, an output terminal 233, a first input terminal 231, and a second input terminal 232. The first input terminal 231 is used for receiving a clock signal, and the second input terminal 232 is used for receiving a touch electrode drive signal; the control terminal 230 is used for receiving a control signal, thereby achieving coupling of the output terminal 233 to the first input terminal 231 or the second input terminal 232 in different stages to transmit a clock signal or a touch electrode drive signal to the clock signal line 22 as needed, thereby satisfying the signal requirements in different stage.

Figure 3:
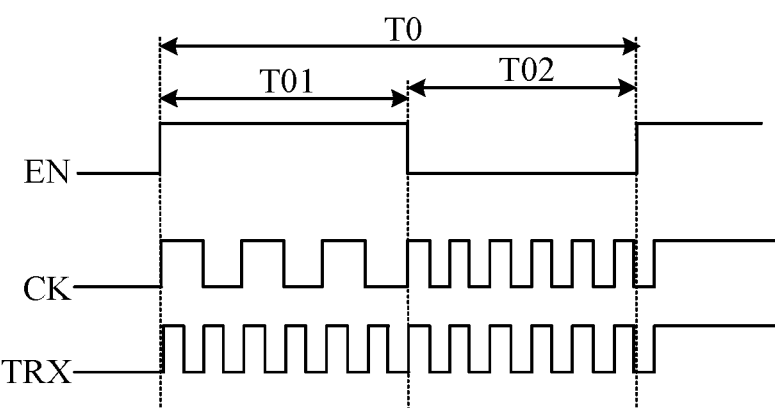
FIG. 3 is a schematic diagram of a drive timing provided by an embodiment of the present disclosure.
Figure 4:
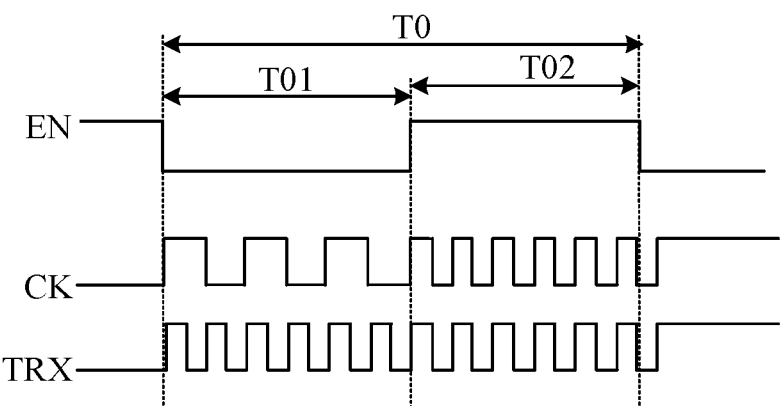
FIG. 4 is a schematic diagram of another drive timing provided by an embodiment of the present disclosure.

Illustratively, FIG. 3 is a schematic diagram of a drive timing provided by an embodiment of the present disclosure, and FIG. 4 is a schematic diagram of another drive timing provided by an embodiment of the present disclosure. On the basis of FIGS. 1 and 2, as shown in FIG. 3 or 4, a frame time T0 of the display panel 10 includes a display stage T01 and a touch stage T02. In the touch stage T02, the control signal received by the control terminal 230 of the gating module 23 is used for instructing the second input terminal 232 of the gating module 23 to be coupled to the output terminal 233 such that the clock signal line 22 can receive the touch electrode drive signal.

In FIGS. 3 and 4, EN represents the control signal, CK represents the signal transmitted on the clock signal line 22, and TRX represents the touch electrode drive signal. As shown in FIG. 3 or 4, in the touch stage T02, the clock signal line 22 receives the touch electrode drive signal TRX, and thus the clock signal line 22 and a touch wire (that is, the touch electrode signal line) synchronously transmit the touch electrode drive signal that is, the signal on the clock signal line 22 is synchronized with the signal on the touch electrode signal line, thereby avoiding the coupling interference of the clock signal to the touch electrode drive signal and improving touch accuracy.

In the scan signal driver circuit 20 provided by the embodiments of the present disclosure, by setting a gating module 23 and coupling the second input terminal 232 of the gating module 23 to the output terminal 233 of the gating module 23 in the touch stage T02, the clock signal line 22 receives the touch electrode drive signal TRX, that is, the clock signal line 22 and the touch wire can synchronously transmit the touch electrode drive signal TRX, thereby avoiding the coupling interference of the clock signal to the touch electrode drive signal and improving touch accuracy.

In some embodiments, the touch electrode drive signal includes a sense electrode drive signal.

The sense electrode drive signal is a signal generated by a sense electrode in response to a touch action and carries the relevant information of the touch action. By processing and parsing the sense electrode drive signal, the touch intention of the user can be obtained so that the display panel performs the corresponding action in response to the touch intention of the user.

The touch principle may be self-capacitive touch or mutual capacitive touch, which is not limited thereto.

Illustratively, the sense electrode drive signal herein may be represented by RX. In other implementations, the touch electrode drive signal may further include a transmit electrode drive signal TX. The clock signal line may also synchronously transmit the transmit electrode drive signal when the display panel is in the touch stage, which is not limited thereto.

In the scan signal driver circuit 20 provided by the embodiments of the present disclosure, the clock signal line 22 can transmit the sense electrode drive signal in the touch stage T02. Because the number of the wires for transmitting the sense electrode drive signal is more than the number of the wires for transmitting the transmit electrode drive signal, the clock signal line 22 is synchronized with the touch electrode drive signal transmitted on a large number of wires, thereby avoiding the coupling interference between the clock signal line 22 and the sense electrode drive signal, reducing the impact of the signal transmitted on the clock signal line 22 on the parsing and determination of the intention of the user based on the sense electrode drive signal, and improving touch control accuracy.

In some embodiments, still referring to FIG. 3 or 4, for a frame time T0 of the display panel 10, the control signal EN includes a first level and a second level; when the control signal EN is at the first level, the display panel 10 is in the display stage T01; when the control signal EN is at the second level, the display panel 10 is in the touch stage T02.

The level of the control signal EN may be switched between a high level and a low level for controlling the switching between the display stage T01 and the touch stage T02 of the display panel 10.

With the level shown in FIG. 3 as an example, the first level is a high level, and the second level is a low level; when the control signal EN is at the high level, the display panel 10 is in the display stage T01; when the control signal EN is at the low level, the display panel 10 is in the touch stage T02.

Alternatively, with the level shown in FIG. 4 as an example, the first level is a low level, and the second level is a high level; when the control signal EN is at the low level, the display panel 10 is in the display stage T01; when the control signal EN is at the high level, the display panel 10 is in the touch stage T02.

In the scan signal driver circuit 20 provided by the embodiments of the present disclosure, the switching control between the display stage T01 and the touch stage T02 can be achieved by switching the level of the control signal EN, so that the switching control manner is simple.

In some embodiments, the gating module 23 may be composed of two transistors having opposite on-state characteristics. Therefore, the gating module 23 has a simple structure, occupies little circuit space, and is convenient to control, as illustratively described below.

Figure 5:
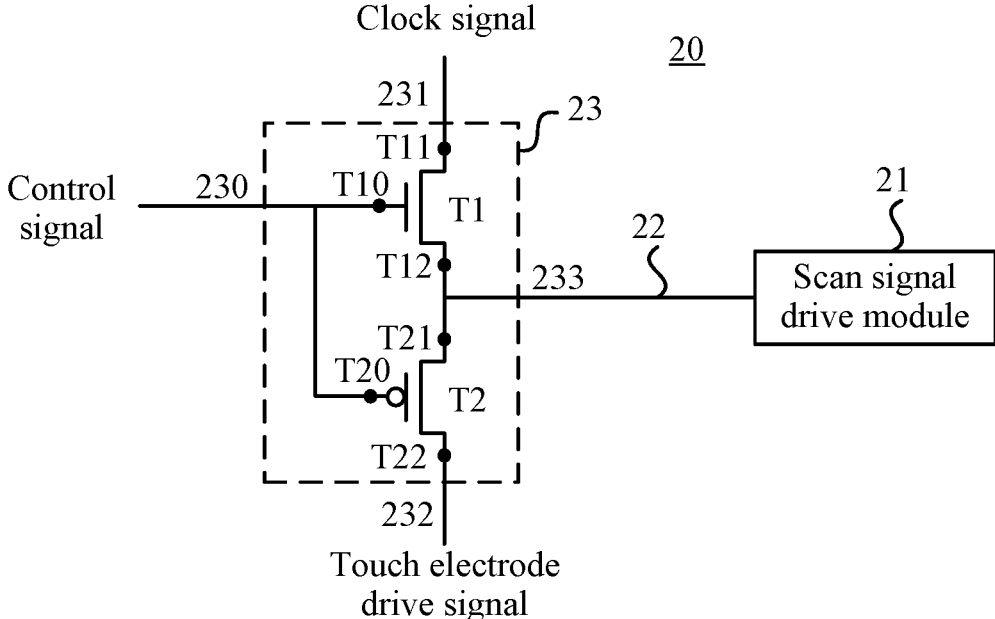
FIG. 5 is a structure diagram of a gating module provided by an embodiment of the present disclosure.
Figure 6:
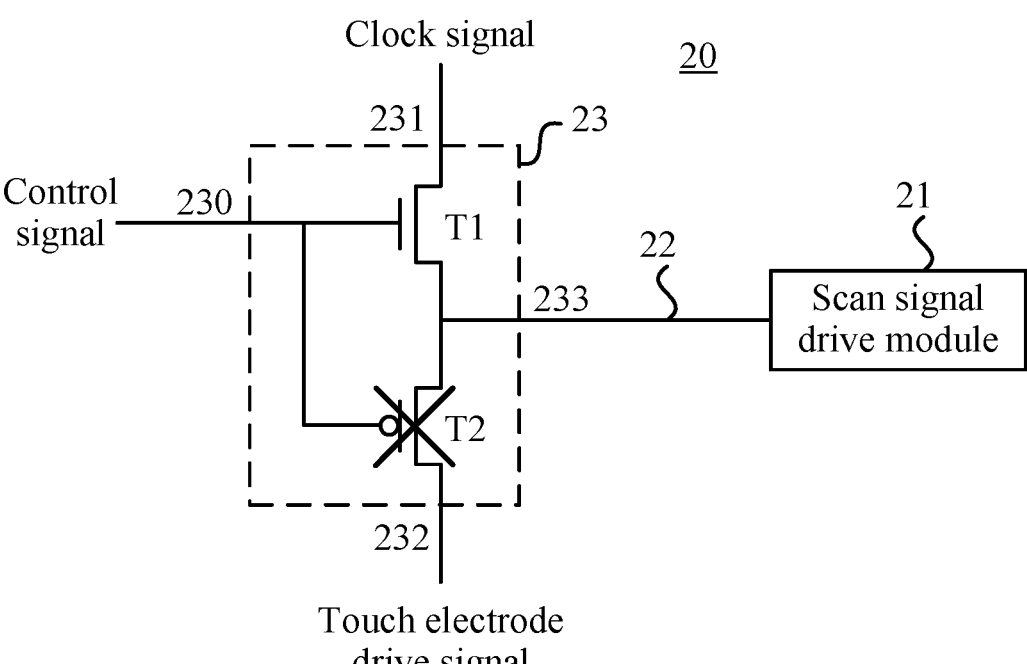
FIG. 6 is a working principle diagram of the gating module shown in FIG. 5 in the display stage.
Figure 7:
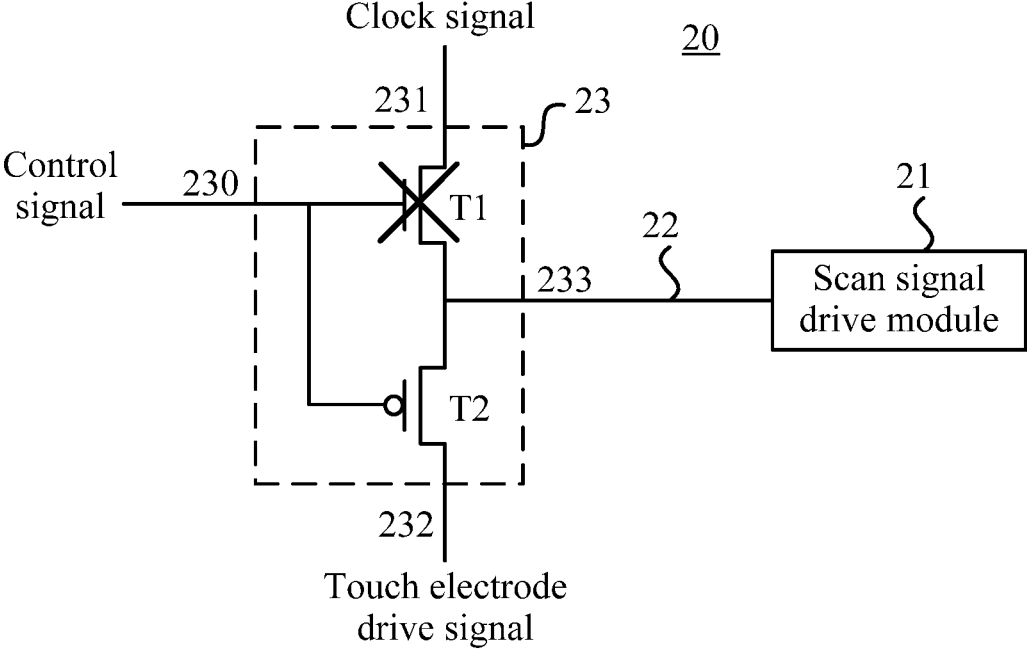
FIG. 7 is a working principle diagram of the gating module shown in FIG. 5 in the touch stage.
Figure 8:
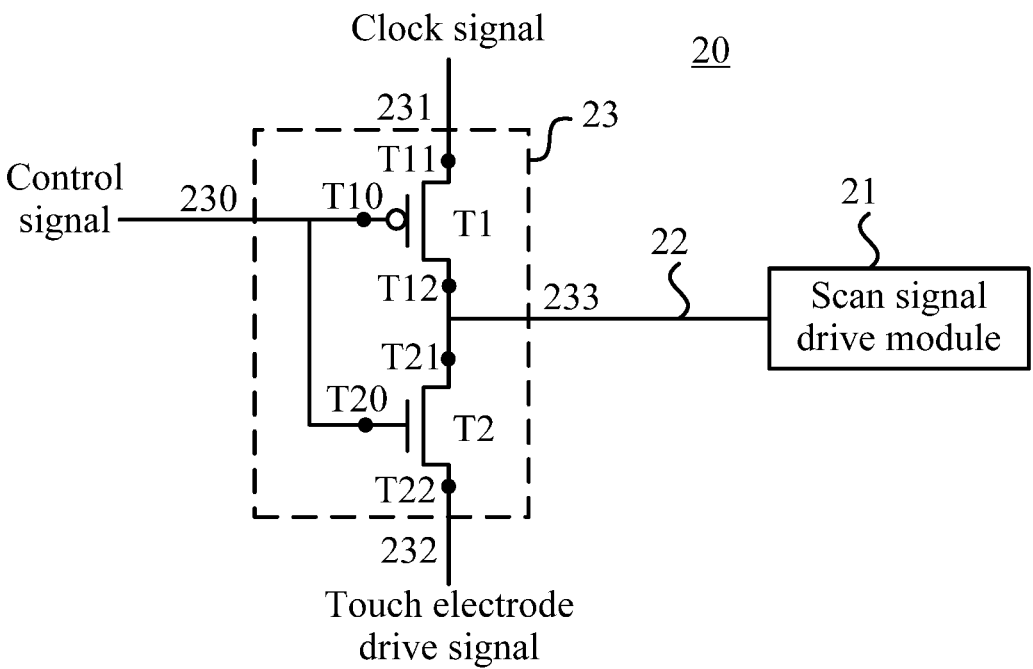
FIG. 8 is a structure diagram of another gating module provided by an embodiment of the present disclosure.
Figure 9:
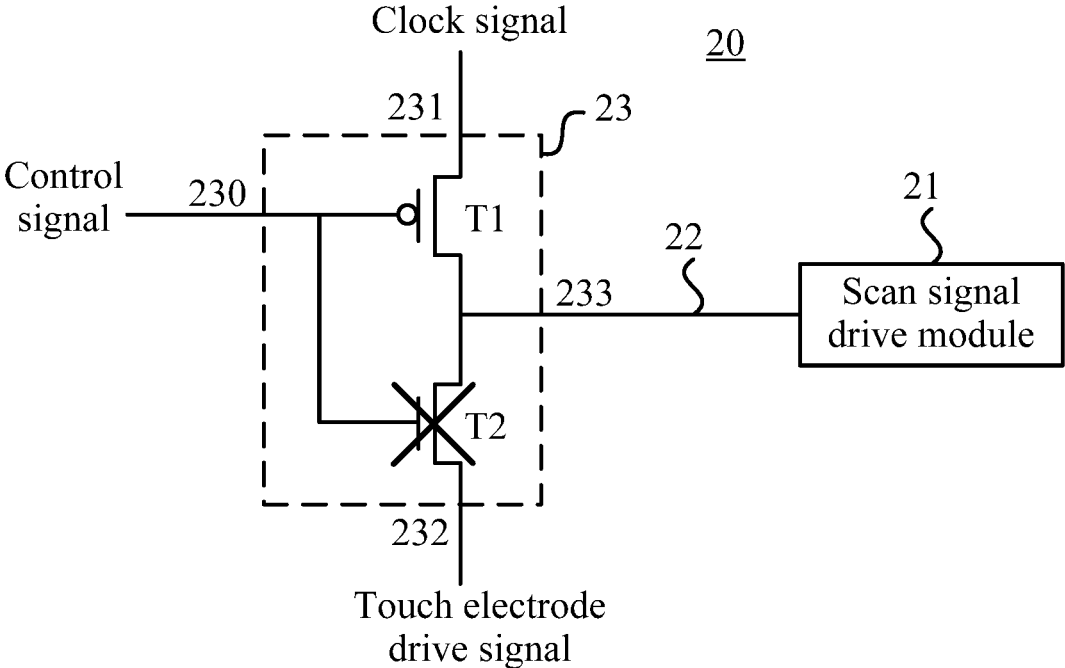
FIG. 9 is a working principle diagram of the gating module shown in FIG. 8 in the display stage.
Figure 10:
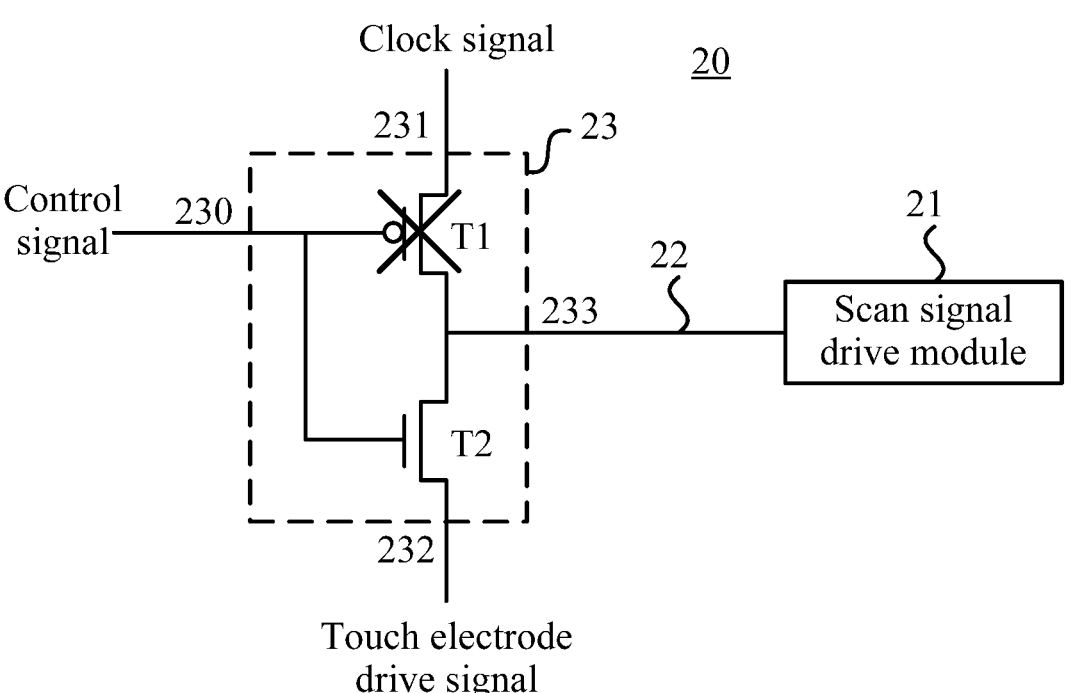
FIG. 10 is a working principle diagram of the gating module shown in FIG. 8 in the touch stage.

Illustratively, FIG. 5 is a structure diagram of a gating module provided by an embodiment of the present disclosure, FIG. 6 is a working principle diagram of the gating module shown in FIG. 5 in the display stage, FIG. 7 is a working principle diagram of the gating module shown in FIG. 5 in the touch stage, FIG. 8 is a structure diagram of another gating module provided by an embodiment of the present disclosure, FIG. 9 is a working principle diagram of the gating module shown in FIG. 8 in the display stage, and FIG. 10 is a working principle diagram of the gating module shown in FIG. 8 in the touch stage.

Illustratively, referring to FIG. 5 or FIG. 8, the gating module 23 includes a first transistor T1 and a second transistor T2. The control terminal 230 of the gating module 23 is coupled to the control electrode T10 of the first transistor T1 and the control electrode T20 of the second transistor T2 so that the on-off states of the first transistor T1 and the second transistor T2 can be synchronously controlled through the control signal inputted from the control terminal 230. The first input terminal 231 of the gating module 23 is coupled to the first electrode T11 of the first transistor T1 for receiving a clock signal. The output terminal 233 of the gating module 23 is coupled to the second electrode T12 of the first transistor T1 and the first electrode T21 of the second transistor T2 for selectively outputting the clock signal or a touch electrode drive signal based on the on-off states of the first transistor T1 and the second transistor T2. The second input terminal 232 of the gating module 23 is coupled to the second electrode T22 of the second transistor T2 for receiving the touch electrode drive signal. The channel type of the first transistor T1 is different from the channel type of the second transistor T2 such that in response to the same control signal received by the control electrodes of the two transistors, only one of the first transistor T1 and the second transistor T2 is turned on and the other transistor is turned off, thereby enabling the gating module 23 to selectively transmit a clock signal or a touch electrode drive signal in response to display or touch requirements at different stages such as the display stage and the touch stage.

Different channel types of the transistors correspond to different on-state characteristics of the transistors. Illustratively, the first transistor T1 is turned on at the high level, and the second transistor T2 is turned on at the low level. Alternatively, the first transistor T1 is turned on at the low level, and the second transistor T2 is turned on at the high level.

Illustratively, the first transistor T1 and the second transistor T2 may be one of an n-type metal oxide semiconductor (NMOS) transistor and a p-type metal oxide semiconductor (PMOS) transistor, respectively, and both are different from each other. The NMOS transistor is turned on at the high level and turned off at the low level; the PMOS transistor is turned on at the low level and turned off at the high level.

In some embodiments, referring to FIGS. 5 to 7, the first level is a high level, the second level is a low level, the first transistor T1 is an NMOS transistor, and the second transistor T2 is a PMOS transistor.

In the embodiments of the present disclosure, the control signal EN is at the first level, that is, the control signal EN is at a high level, the display panel 10 is in the display stage T01, as shown in FIG. 3. In this case, the first transistor T1 is turned on, and the second transistor T2 is turned off, as shown in FIG. 6; accordingly, the output terminal 233 of the gating module 23 is coupled to the first input terminal 231 of the gating module 23, and the output terminal 233 of the gating module 23 transmits a clock signal to the clock signal line 22, so that the clock signal line 22 receives the clock signal, and the display panel 10 achieves the image display.

Alternatively, the control signal EN is at the second level, that is, the control signal EN is at a low level, the display panel 10 is in the touch stage T02, as shown in FIG. 3. At this point, the first transistor T1 is turned off, and the second transistor T2 is turned on, as shown in FIG. 7; accordingly, the output terminal 233 of the gating module 23 is coupled to the second input terminal 232 of the gating module 23, and the output terminal 233 of the gating module 23 transmits a touch electrode drive signal to the clock signal line 22, so that the clock signal line 22 receives the touch electrode drive signal, and the display panel 10 achieves the accurate touch.

In some embodiments, referring to FIGS. 8 to 10, the first level is a low level, the second level is a high level, the first transistor T1 is a PMOS transistor, and the second transistor T2 is an NMOS transistor.

In the embodiments of the present disclosure, the control signal EN is at the first level, that is, the control signal EN is at a low level, the display panel 10 is in the display stage T01, as shown in FIG. 4. In this case, the first transistor T1 is turned on, and the second transistor T2 is turned off, as shown in FIG. 9; accordingly, the output terminal 233 of the gating module 23 is coupled to the first input terminal 231 of the gating module 23, and the output terminal 233 of the gating module 23 transmits a clock signal to the clock signal line 22, so that the clock signal line 22 receives the clock signal, and the display panel 10 achieves the image display.

Alternatively, the control signal EN is at the second level, that is, the control signal EN is at a high level, the display panel 10 is in the touch stage T02, as shown in FIG. 4. In this case, the first transistor T1 is turned off, and the second transistor T2 is turned on, as shown in FIG. 10; accordingly, the output terminal 233 of the gating module 23 is coupled to the second input terminal 232, and the output terminal 233 of the gating module 23 transmits a touch electrode drive signal to the clock signal line 22, so that the clock signal line 22 receives the touch electrode drive signal, and the display panel 10 achieves the accurate touch.

In the preceding embodiments, through the setting of the high and low levels of the control signal EN and the channel type setting of the first transistor T1 and the second transistor T2 in the gating module 23, when the control signal EN is at the first level, the display panel 10 is in the display stage T01, the output terminal 233 of the gating module 23 is accordingly coupled to the first input terminal 231 of the gating module 23, the clock signal line 22 transmits the clock signal, so that the display panel can achieve the image display; when the control signal EN is at the second level, the display panel 10 is in the touch stage T02, the output terminal 233 of the gating module 23 is accordingly coupled to the second input terminal 232 of the gating module 23, the clock signal line 22 transmits the touch electrode drive signal, so that the display panel can achieve the accurate touch. The overall structures of the gating module 23 and the scan signal driver circuit are simple, and the control manner is simple.

Figure 11:
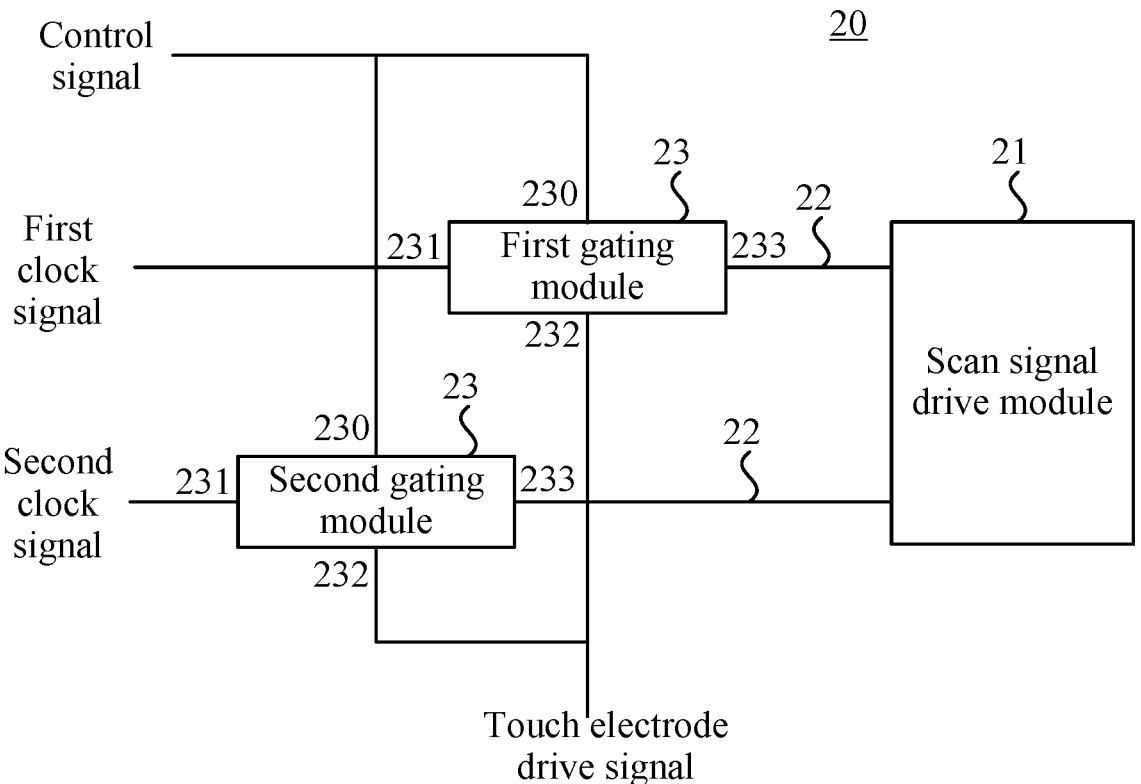
FIG. 11 is a structure diagram of another scan signal driver circuit provided by an embodiment of the present disclosure.

In some embodiments, FIG. 11 is a structure diagram of another scan signal driver circuit provided by an embodiment of the present disclosure. Referring to FIG. 11, the scan signal drive module 21 may include a first input terminal and a second input terminal, and the corresponding clock signal inputting into the first input terminal may be a first clock signal (for example, CK or CK1) and the corresponding clock signal inputting into the second input terminal may be a second clock signal (for example, XCK or CK2). A gating module 23 may be set for each clock signal to replace the corresponding clock signal with a touch electrode drive signal in the touch stage so that the clock signal line is synchronized with the touch wire transmit signals in the touch stage, thereby avoiding the coupling interference and improving touch accuracy.

Figure 12:
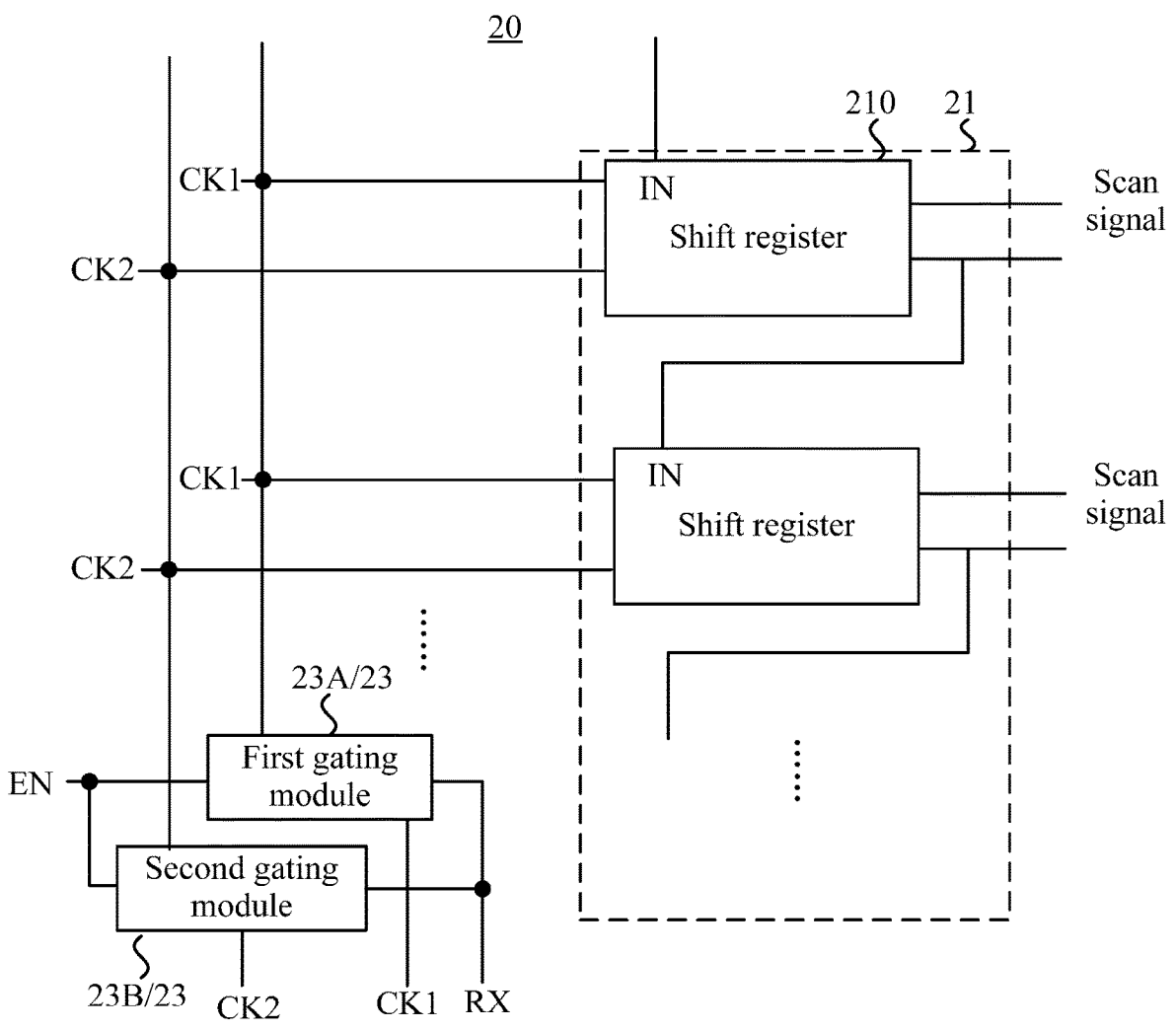
FIG. 12 is a structure diagram of another scan signal driver circuit provided by an embodiment of the present disclosure.
Figure 13:
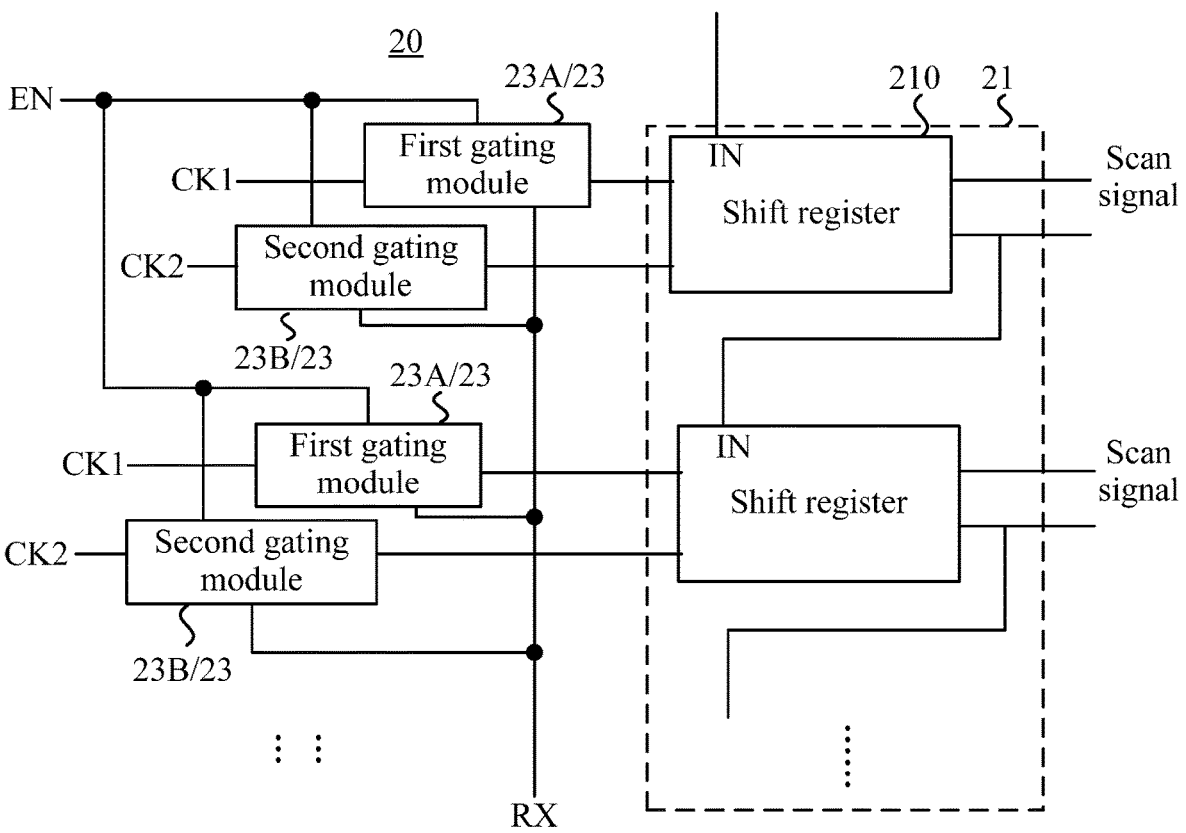
FIG. 13 is a structure diagram of another scan signal driver circuit provided by an embodiment of the present disclosure.

In some embodiments, FIG. 12 is a structure diagram of another scan signal driver circuit provided by an embodiment of the present disclosure, and FIG. 13 is a structure diagram of another scan signal driver circuit provided by an embodiment of the present disclosure. Referring to FIG. 12 or 13, the scan signal drive module 21 includes multiple cascaded shift registers 210; each shift register 210 includes N clock signal input terminals to receive N clock signals, where N is a positive integer; the number of gating modules 23 is an integer multiple of N.

The signal output terminals of multiple shift registers 210 correspond to one gate drive line, respectively. In the display stage, the gating module 23 gates a clock signal, the clock signal line 22 provides the clock signal for the corresponding shift registers 210, and the shift registers 210 sequentially output a gate drive signal (that is, a scan signal) to the corresponding gate drive lines in the scanning direction under the control of the clock signal.

Illustratively, the value of N may be 2, as shown in FIG. 11, 12 or 13, and each shift register 210 includes two clock signal input terminals to receive two clock signals; in other implementations, the value of N may also be 1, 3, 4 or other positive integer values, which are not limited thereto.

In the scan signal driver circuit 20 provided by the embodiments of the present disclosure, the number of gating modules 23 is associated with the number of clock signal input terminals of each shift register 210, and for example, the number of gating modules 23 may be an integer multiple of the number of clock input terminals of each shift register 210, for example, 1, 2, 3 or more times. A gating module 23 is thus correspondingly set for each clock signal input terminal of each shift register 210, and the signal on each clock signal line can be replaced with a touch electrode drive signal under the control of the gating module 23. In this manner, after the signal switching in the touch stage, the clock signal line transmits the touch electrode drive signal in the touch stage, thereby avoiding the coupling interference between the clock signal and the touch electrode drive signal and improving touch accuracy.

In some embodiments, as shown in FIG. 12, the number of gating modules 23 is N, and clock signal input terminals, which are configured to receive the same clock signal, of the shift registers 210 are coupled to the same gating module 23. Illustratively, the value of N is 2, the number of clock signal input terminals of each shift register 210 is 2, and the number of corresponding gating modules 23 is 2.

The number of gating modules 23 is equal to the number of clock signal input terminals of each shift register 210, and the clock signal input terminals configured to receive the same clock signal in shift registers 210 in the scan signal drive module 21 are coupled to the same gating module 23. Illustratively, a first gating module 23A is set for a first clock signal CK1, and a second gating module 23B is set for a second clock signal CK2, that is, the same clock signal may share the same gating module 23, so that the number of gating modules 23 in the scan signal driver circuit 20 as a whole is relatively small and the space occupied by the gating modules 23 in the non-display region is relatively little, thereby facilitating a narrow bezel design.

In some embodiments, as shown in FIG. 13, the number of gating modules 23 is N×M, M is the stage number of the shift registers 210, and the clock signal input terminals of each shift register 210 are coupled to different gating modules 23, where M is a positive integer. Illustratively, the total stage number of the shift registers 210 is M, the number of clock signal input terminals of each shift register 210 is 2, and the number of corresponding gating modules 23 is 2M.

The number of gating modules 23 is equal to the total number of clock signal input terminals of all shift registers 210 in the scan signal drive module 21, and the clock signal input terminal of each clock signal in each shift register 210 in the scan signal drive module 21 is coupled to one gating module 23. Illustratively, a first gating module 23A is set for a first clock signal input terminal in each shift register 210 for inputting a first clock signal CK1, and a second gating module 23B is set for a second clock signal input terminal in each shift register 210 for inputting a second clock signal CK2, that is, one gating module 23 may be set for each clock signal input terminal of each shift register 210. In this manner, the number distribution of the gating modules 23 in the scan signal driver circuit 20 may be uniform, thereby facilitating the balance of the device layout in the related layers and improving the uniformity of the layer. In addition, the corresponding gating modules 23 are used for different clock signals to control the synchronization of the clock signals with the touch electrode drive signal, thereby achieving precision control, improving signal stability, and improving the display effect.

Based on the same concept, the embodiments of the present disclosure further provide a display panel.

In the display panel provided by the embodiments of the present disclosure, by setting a gating module and coupling the second input terminal of the gating module to the output terminal of the gating module in the touch stage, the clock signal line is configured to receive the touch electrode drive signal transmitted by the touch electrode signal line, that is, the clock signal line and the touch electrode signal line can synchronously transmit the touch electrode drive signal, thereby avoiding the coupling interference of the clock signal to the touch electrode drive signal and improving the touch accuracy.

Alternatively, the display panel provided by the embodiments of the present disclosure may include the scan signal driver circuit provided by any of the preceding implementations and can achieve the corresponding beneficial effects. For details, reference may be made to the above description, and the details are not repeated herein.

Figure 14:
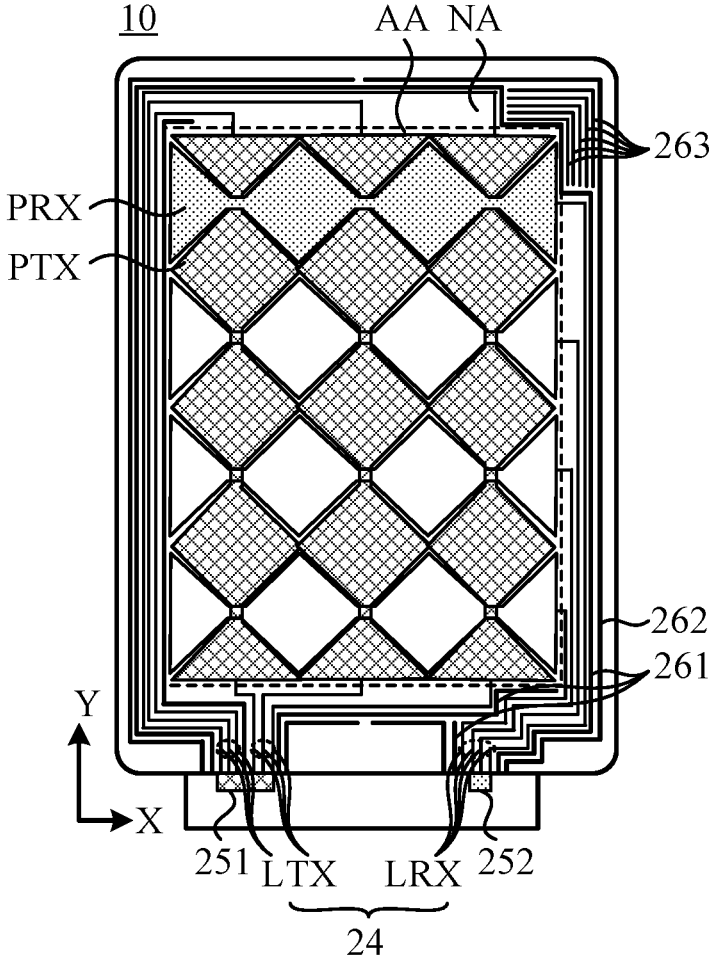
FIG. 14 is a structure diagram of another display panel provided by an embodiment of the present disclosure.
Figure 15:
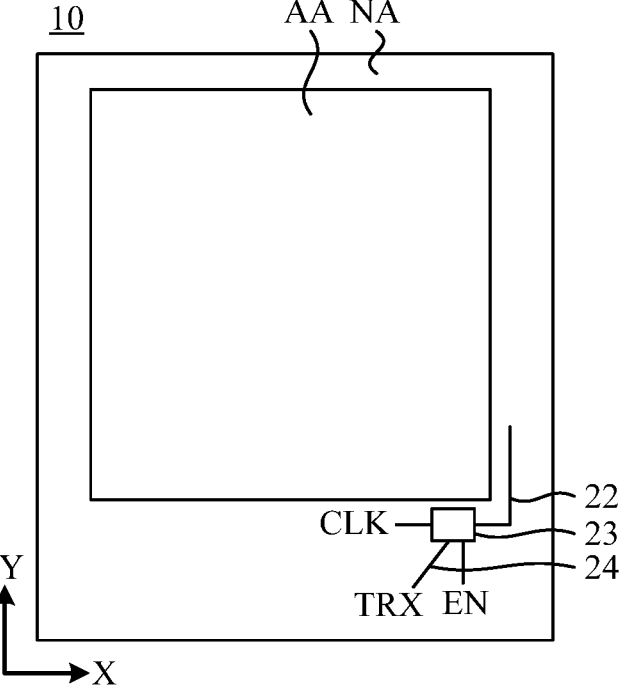
FIG. 15 is a structure diagram of another display panel provided by an embodiment of the present disclosure.
Figure 16:
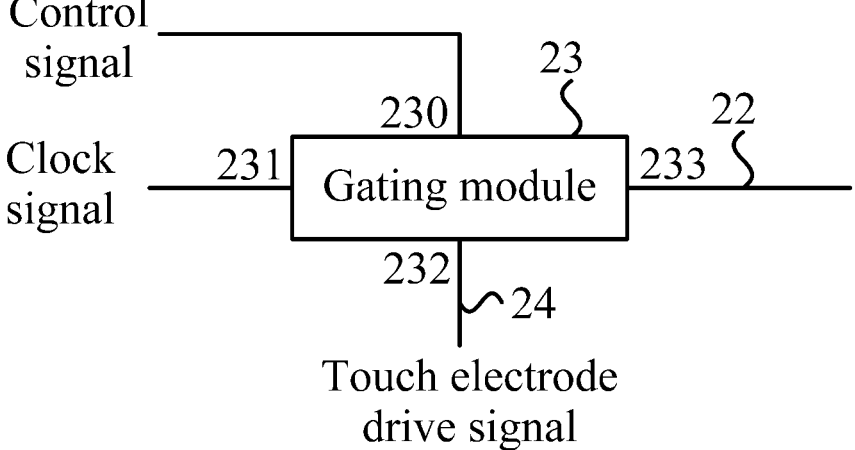
FIG. 16 is a detailed structure diagram of a gating module provided by an embodiment of the present disclosure.

Illustratively, FIG. 14 is a structure diagram of another display panel provided by an embodiment of the present disclosure, FIG. 15 is a structure diagram of another display panel provided by an embodiment of the present disclosure, and FIG. 16 is a detailed structure diagram of a gating module provided by an embodiment of the present disclosure. Referring to FIGS. 14 to 16, the display panel 10 includes a display region AA and a non-display region NA at least partially surrounding the display region AA. The display panel AA includes a touch electrode signal line 24, a clock signal line 22, and a gating module 23 in the non-display region NA. The gating module 23 includes a control terminal 230, a first input terminal 231, a second input terminal 231, and an output terminal 233. The control terminal 230 is configured to receive a control signal, the first input terminal 231 is configured to receive a clock signal, the second input terminal 232 is coupled to the touch electrode signal line 24 to receive a touch electrode drive signal, and the output terminal 233 is coupled to the clock signal line 22.

The touch electrode signal line 24 is used for transmitting the touch electrode drive signal. Illustratively, with mutual capacitive touch as an example, as shown in FIG. 14, the touch electrode may include a transmit electrode PTX and a sense electrode PRX, and the touch electrode signal line 24 may accordingly include a first signal line LTX and a second signal line LRX. The first signal line LTX is connected to the transmit electrode PTX and the second signal line is connected to the sense electrode PRX for transmitting a transmit electrode drive signal and a sense electrode drive signal, respectively. The arrangement of the transmit electrode PTX and the sense electrode PRX is not limited by the present embodiment.

Illustratively, in conjunction with FIG. 3 or 4, a frame time T0 of the display panel 10 includes a display stage T01 and a touch stage T02. In the touch stage T02, the control signal received by the control terminal 230 of the gating module 23 is used for instructing the output terminal 233 of the gating module 23 to be coupled to the second input terminal 232 of the gating module 23 such that the clock signal line 22 is configured to receive the touch electrode drive signal.

In the display panel 10 provided by the embodiments of the present disclosure, by setting a gating module 23 and coupling the second input terminal 232 of the gating module 23 to the output terminal 233 in the touch stage T02, the clock signal line 22 is coupled to the touch electrode signal line 24 through the gating module 23 and is configured to receive the touch electrode drive signal TRX, that is, the clock signal line 22 and the touch electrode signal line 24 can synchronously transmit the touch electrode drive signal TRX, thereby avoiding the coupling interference of the clock signal to the touch electrode drive signal and improving the touch accuracy.

In some embodiments, still referring to FIG. 14, the display panel 10 further includes a first connecting member 251 and a second connecting member 252 in the non-display region NA, the first signal line LTX is connected to the first connecting member 251, and the second signal line LRX is connected to the second connecting member 252. Illustratively, the first connecting member 251 is used for transferring the transmit electrode drive signal into the display panel, and the second connecting member 252 is used for transferring the sense electrode drive signal into the display panel.

In some embodiments, still referring to FIG. 14, the display panel 10 further includes a protection signal line 261, a ground signal line 262, and a dummy signal line 263 in the non-display region NA. The protection signal line 261 surrounds both sides of the touch electrode signal line 24 facing close to and facing away from the display region AA, the ground signal line 262 surrounds a side of the protection signal line 261 facing away from the display region AA, and the dummy signal line 263 compensates for the space between the protection signal line 261 and the ground signal line 262 in the upper right corner for improving the wiring uniformity.

In some embodiments, still referring to FIG. 3 or 4, for a frame time T0 of the display panel 10, the control signal EN includes a first level and a second level; when the control signal EN is at the first level, the display panel 10 is in the display stage T01; when the control signal EN is at the second level, the display panel 10 is in the touch stage T02.

The level of the control signal EN may be switched between a high level and a low level for controlling the switching between the display stage T01 and the touch stage T02 of the display panel 10.

With the level shown in FIG. 3 as an example, the first level is a high level, and the second level is a low level; when the control signal EN is at the high level, the display panel 10 is in the display stage T01; when the control signal EN is at the low level, the display panel 10 is in the touch stage T02.

Alternatively, with the level shown in FIG. 4 as an example, the first level may be a low level, and the second level may be a high level; when the control signal EN is at the low level, the display panel 10 is in the display stage T01; when the control signal EN is at the high level, the display panel 10 is in the touch stage T02.

In the display panel 10 provided by the embodiments of the present disclosure, the switching control between the display stage T01 and the touch stage T02 can be achieved by switching the level of the control signal EN, and the switching control manner is simple.

In some embodiments, the gating module 23 may be composed of two transistors having opposite on-state characteristics. Therefore, the gating module 23 has a simple structure, occupies little circuit space, and is convenient to control, as illustratively described below.

Illustratively, still referring to FIG. 5 or 8, the gating module 23 includes a first transistor T1 and a second transistor T2. The control terminal 230 of the gating module 23 is coupled to a control electrode T10 of the first transistor T1 and a control electrode T20 of the second transistor T2, the first input terminal 231 of the gating module 23 is coupled to a first electrode T11 of the first transistor T1, the output terminal 233 of the gating module 23 is coupled to a second electrode T12 of the first transistor T1 and a first electrode T21 of the second transistor T2, and the second input terminal 232 of the gating module 23 is coupled to a second electrode T22 of the second transistor T2. The channel type of the first transistor T1 is different from the channel type of the second transistor T2.

Different channel types of the transistors correspond to different on-state characteristics of the transistors. Illustratively, the first transistor T1 is turned on at the high level, and the second transistor T2 is turned on at the low level. Alternatively, the first transistor T1 is turned on at the low level, and the second transistor T2 is turned on at the high level.

Specifically, the first transistor T1 and the second transistor T2 may be one of an NMOS transistor and a PMOS transistor, respectively, and both are different from each other. The NMOS transistor is turned on at the high level and turned off at the low level; the PMOS transistor is turned on at the low level and turned off at the high level.

In some embodiments, still referring to FIGS. 5 to 7, the first level is a high level, the second level is a low level, the first transistor T1 is an NMOS transistor, and the second transistor T2 is a PMOS transistor.

In the embodiments of the present disclosure, the control signal EN is at the first level, that is, the control signal EN is at a high level, the display panel 10 is in the display stage T01, as shown in FIG. 3. In this case, the first transistor T1 is turned on, and the second transistor T2 is turned off, as shown in FIG. 6; accordingly, the output terminal 233 of the gating module 23 is coupled to the first input terminal 231, the output terminal 233 of the gating module 23 transmits a clock signal to the clock signal line 22, the clock signal line 22 receives the clock signal, so that the display panel 10 can achieve the image display.

Alternatively, the control signal EN is at the second level, that is, the control signal EN is at a low level, the display panel 10 is in the touch stage T02, as shown in FIG. 3. In this case, the first transistor T1 is turned off, and the second transistor T2 is turned on, as shown in FIG. 7; accordingly, the output terminal 233 of the gating module 23 is coupled to the second input terminal 232, the output terminal 233 of the gating module 23 transmits a touch electrode drive signal to the clock signal line 22, and the clock signal line 22 receives the touch electrode drive signal, so that the display panel 10 can achieve the accurate touch.

Alternatively, still referring to FIGS. 8 to 10, the first level is a low level, the second level is a high level, the first transistor is a PMOS transistor, and the second transistor is an NMOS transistor.

In the embodiments of the present disclosure, the control signal EN is at the first level, that is, the control signal EN is at a low level, the display panel 10 is in the display stage T01, as shown in FIG. 4. In this case, the first transistor T1 is turned on, and the second transistor T2 is turned off, as shown in FIG. 9; accordingly, the output terminal 233 of the gating module 23 is coupled to the first input terminal 231, the output terminal 233 of the gating module 23 transmits a clock signal to the clock signal line 22, and the clock signal line 22 receives the clock signal, so that the display panel 10 can achieve the image display.

Alternatively, the control signal EN is at the second level, that is, the control signal EN is at a high level, the display panel 10 is in the touch stage T02, as shown in FIG. 4. In this case, the first transistor T1 is turned off, and the second transistor T2 is turned on, as shown in FIG. 10; accordingly, the output terminal 233 of the gating module 23 is coupled to the second input terminal 232, the output terminal 233 of the gating module 23 transmits a touch electrode drive signal to the clock signal line 22, and the clock signal line 22 receives the touch electrode drive signal, so that the display panel 10 can achieve the accurate touch.

In the preceding embodiments, through the setting of the high and low levels of the control signal EN and the channel type setting of the first transistor T1 and the second transistor T2 in the gating module 23, when the control signal EN is at the first level, the display panel 10 is in the display stage T01, the output terminal 233 of the gating module 23 is accordingly coupled to the first input terminal 231 of the gating module 23, the clock signal line 22 is configured to transmit the clock signal, so that the display panel achieves the image display; when the control signal EN is at the second level, the display panel 10 is in the touch stage T02, the output terminal 233 of the gating module 23 is accordingly coupled to the second input terminal 232 of the gating module 23, the clock signal line 22 is configured to transmit the touch electrode drive signal, so that the display panel achieve the accurate touch. The overall structures of the gating module 23 and the scan signal driver circuit are simple, and the control manner is simple.

Figure 17:
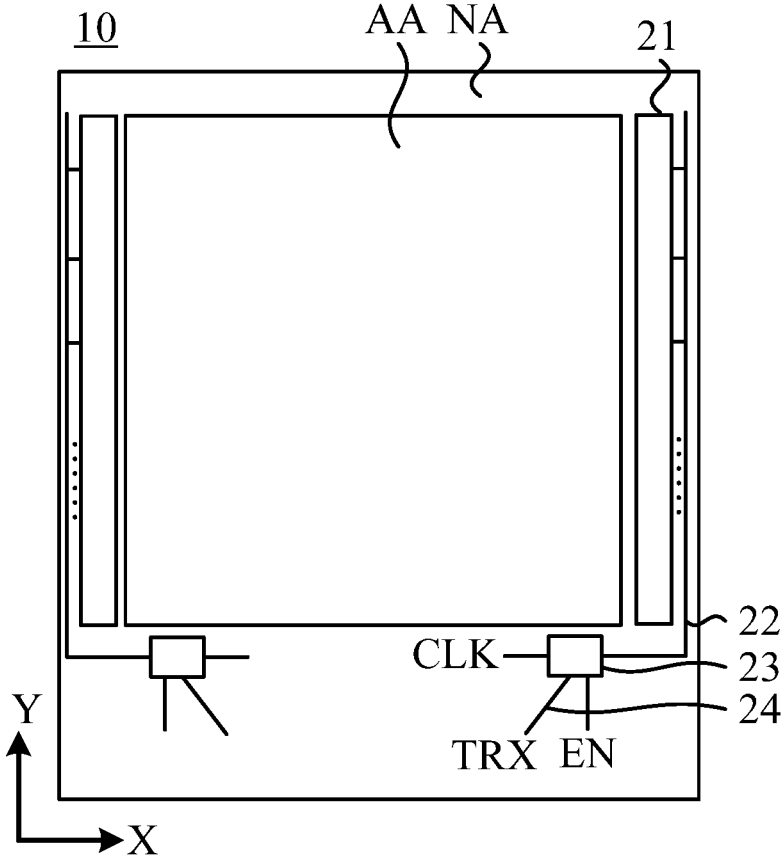
FIG. 17 is a structure diagram of another display panel provided by an embodiment of the present disclosure.

In some embodiments, FIG. 17 is a structure diagram of another display panel provided by an embodiment of the present disclosure. Referring to FIG. 17, the display panel 10 may further include a scan signal drive module 21 in the non-display region NA, and a clock signal input terminal of the scan signal drive module 21 is coupled to the clock signal line 22.

The clock signal line 22 can transmit a clock signal to the scan signal drive module 21 in the display stage, and the scan signal drive module 21 is used for outputting a gate drive signal, that is, a scan signal, according to the clock signal in the display stage to drive light-emitting elements to emit light using pixel driver circuits to achieve the image display.

In some embodiments, still referring to FIG. 12 or 13, the scan signal drive module 21 includes multiple cascaded shift registers 210; each of the shift registers 210 includes N clock signal input terminals configured to receive N clock signals, where N is a positive integer; the number of gating modules 23 is an integer multiple of N.

The signal output terminals of multiple shift registers 210 correspond to one gate drive line, respectively. In the display stage, the gating module 23 gates a clock signal, the clock signal line 22 provides the clock signal for the corresponding shift registers 210, and the shift registers 210 sequentially output a gate drive signal (that is, a scan signal) to the corresponding gate drive lines in the scanning direction under the control of the clock signal.

Illustratively, the value of N may be 2, as shown in FIG. 11, 12 or 13, and each shift register 210 includes two clock signal input terminals to receive two clock signals; in other implementations, the value of N may also be 1, 3, 4 or other positive integer values, which are not limited thereto.

In the display panel 10 provided by the embodiments of the present disclosure, the number of gating modules 23 is associated with the number of clock signal input terminals of each shift register 210, and for example, the number of gating modules 23 may be an integer multiple of the number of clock input terminals of each shift register 210, for example, 1, 2, 3 or more times. A gating module 23 is thus correspondingly set for each clock signal input terminal of each shift register 210, and the signal on each clock signal line can be replaced with a touch electrode drive signal under the control of the gating module 23. In this manner, after the signal switching in the touch stage, the clock signal line transmits the touch electrode drive signal in the touch stage, thereby avoiding the coupling interference between the clock signal and the touch electrode drive signal and improving touch accuracy.

In some embodiments, as shown in FIG. 12, the number of gating modules 23 is N, and clock signal input terminals, which are configured to receive the same clock signal, of the shift registers 210 are coupled to the same gating module 23. Illustratively, the value of N is 2, the number of clock signal input terminals of each shift register 210 is 2, and the number of corresponding gating modules 23 is 2.

The number of gating modules 23 is equal to the number of clock signal input terminals of each shift register 210, and the clock signal input terminals configured to receive the same clock signal in shift registers 210 in the scan signal drive module 21 are coupled to the same gating module 23. Illustratively, a first gating module 23A is set for a first clock signal CK1, and the second gating module 23B is set for a second clock signal CK2, that is, the same clock signal may share the same gating module 23, so that the number of gating modules 23 in the scan signal driver circuit 20 as a whole is relatively small and the space occupied by the gating modules 23 in the non-display region is relatively little, thereby facilitating a narrow bezel design.

In some embodiments, still referring to FIG. 13, the number of gating modules 23 is N×M, M is the stage number of the shift registers 210, and the clock signal input terminals of each shift register 210 are coupled to different gating modules 23, where M is a positive integer. Illustratively, the total stage number of the shift registers 210 is M, the number of clock signal input terminals of each shift register 210 is 2, and the number of corresponding gating modules 23 is 2M.

The number of gating modules 23 is equal to the total number of clock signal input terminals of all shift registers 210 in the scan signal drive module 21, and the clock signal input terminal of each clock signal in each shift register 210 in the scan signal drive module 21 is coupled to one gating module 23. Illustratively, a first gating module 23A is set for a first clock signal input terminal in each shift register 210 for inputting a first clock signal CK1, and a second gating module 23B is set for a second clock signal input terminal in each shift register 210 for inputting a second clock signal CK2, that is, one gating module 23 may be set for each clock signal input terminal of each shift register 210. In this manner, the number distribution of the gating modules 23 in the scan signal driver circuit 20 may be uniform, thereby facilitating the balance of the device layout in the related layers and improving the uniformity of the layer. In addition, the corresponding gating modules 23 are used for different clock signals to control the synchronization of the clock signals with the touch electrode drive signal, thereby achieving precision control, improving signal stability, and improving the display effect.

Figure 18:
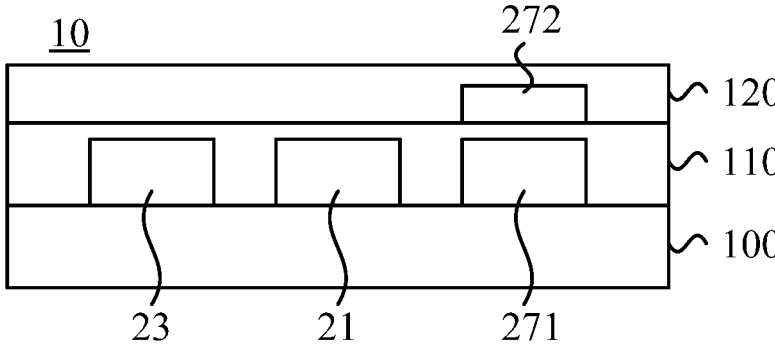
FIG. 18 is a sectional view of another display panel provided by an embodiment of the present disclosure.

In some embodiments, FIG. 18 is a sectional view of another display panel provided by an embodiment of the present disclosure. Referring to FIG. 18, the gating module 23 and the pixel circuit 21 are at least partially disposed in the same layer.

The gating module 23 may include a transistor, and the scan signal drive module 21 may further include a transistor. Thus, the transistor in the gating module 23 and the transistor in the scan signal drive module 21 may be formed synchronously using the same process and have the same layer structure.

In other implementations, the scan signal drive module 21 may further include a capacitor.

Illustratively, as shown in FIG. 18, the display panel 10 may include a substrate 100, a thin-film transistor layer 110 on a side of the substrate 100, and a light-emitting element layer 120 on a side of the thin-film transistor layer 110 away from the substrate 100. Illustratively, the thin-film transistor layer 110 may include a related layer of a low-temperature polysilicon thin-film transistor and/or an oxide transistor, and the light-emitting element layer 120 may include a light-emitting material layer and an electrode layer. The thin-film transistor layer 110 includes devices such as a transistor and a capacitor, and the light-emitting element layer 120 may include a light-emitting element 272.

In the embodiments of the present disclosure, when the gating module 23 and the scan signal drive module 21 are at least partially disposed in the same layer, the layers of the display panel 10 can be fully utilized without additionally increasing layers, thereby facilitating a lightweight design of the display panel 10.

Figure 19:
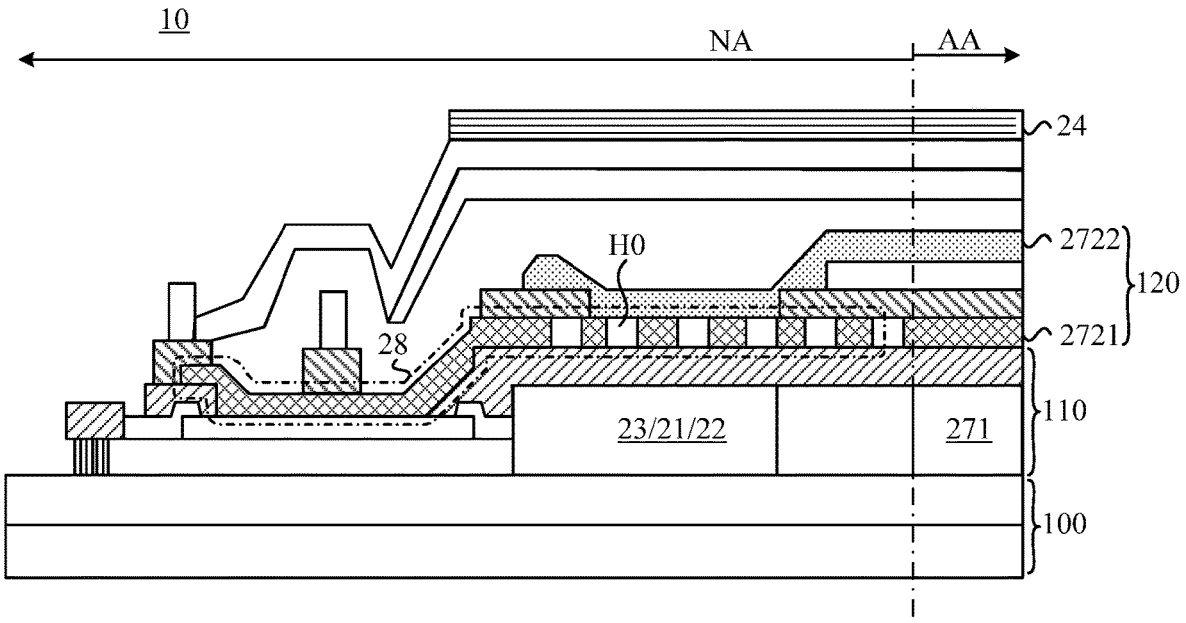
FIG. 19 is a sectional view of another display panel provided by an embodiment of the present disclosure.
Figure 20:
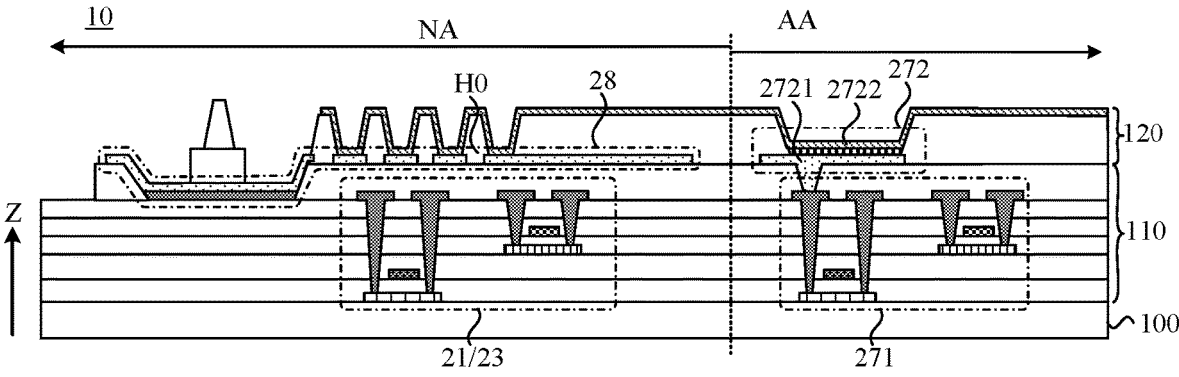
FIG. 20 is a sectional view of another display panel provided by an embodiment of the present disclosure.

In some embodiments, FIG. 19 is a sectional view of another display panel provided by an embodiment of the present disclosure, and FIG. 20 is a sectional view of another display panel provided by an embodiment of the present disclosure. Referring to FIGS. 19 and 20, in the display region AA, the display panel 10 includes a pixel circuit 271, a light-emitting element 272 including oppositely disposed first electrode 2721 and second electrode 2722, and a light-emitting material layer between the first electrode 2721 and the second electrode 2722. The display panel 10 further includes a power lead 28 in the non-display region NA. The first electrode 2721 of the light-emitting element 272 is connected to the pixel circuit 271, the second electrode 2722 of the light-emitting element 272 is configured to extend from the display region AA to the non-display region NA and is coupled to the power lead 28, and the power lead 28 and the first electrode 2721 are disposed in the same layer. The power lead 28 is configured to supply a power signal to the light-emitting element 272 through the second electrode 2722, and the power signal may be, for example, a common power signal.

In some embodiments, still referring to FIG. 19, the touch electrode signal line 24 and the clock signal line 22 are located on two opposite sides of the power lead 28 in a thickness direction Z of the display panel 10. Illustratively, the clock signal line 22 may be disposed in the thin-film transistor layer and located on a side of the power lead 28 facing the substrate 100, and the touch electrode signal line 24 may be located on a side of the power lead 28 facing away from the substrate 100. The thickness direction Z is a direction perpendicular to the plane where the substrate 100 is located, and the plane where the substrate 100 is located is a plane determined by the first direction X and the second direction Y.

With such an arrangement, the distance between the touch electrode signal line 24 and the clock signal line 22 is far, reducing the coupling interference therebetween; meanwhile, the touch electrode signal line 24 can be attached to the surface of the display panel 10 so that the structure is simple and the process difficulty is low.

In other implementations, the touch electrode signal line 24 and the clock signal line 22 may also be disposed in other spatial relative positional relationships, which is not limited thereto.

In some embodiments, still referring to FIGS. 19 and 20, the gating module 23 and the pixel circuit 271 are at least partially disposed in the same layer.

The gating module 23 may include a transistor, and the pixel circuit 271 may further include a transistor. Thus, the transistor in the gating module 23 and the transistor in the pixel circuit 271 may be formed synchronously using the same process and have the same layer structure.

In other implementations, the pixel circuit 271 may further include a capacitor.

Illustratively, as shown in FIGS. 19 and 20, the display panel 10 may include a substrate 100, a thin-film transistor layer 110 on a side of the substrate 100, and a light-emitting element layer 120 on a side of the thin-film transistor layer 110 away from the substrate 100. Illustratively, the thin-film transistor layer 110 may include a related layer of a low-temperature polysilicon thin-film transistor and/or an oxide transistor, and the light-emitting element layer 120 may include a light-emitting material layer and an electrode layer. The thin-film transistor layer 110 includes devices such as a transistor and a capacitor, and the light-emitting element layer 120 may include the light-emitting element 272.

In the embodiments of the present disclosure, when the gating module 23 and the pixel circuit 271 are at least partially disposed in the same layer, the layers of the display panel 10 can be fully utilized without additionally increasing layers, thereby facilitating a lightweight design of the display panel 10.

Figure 21:
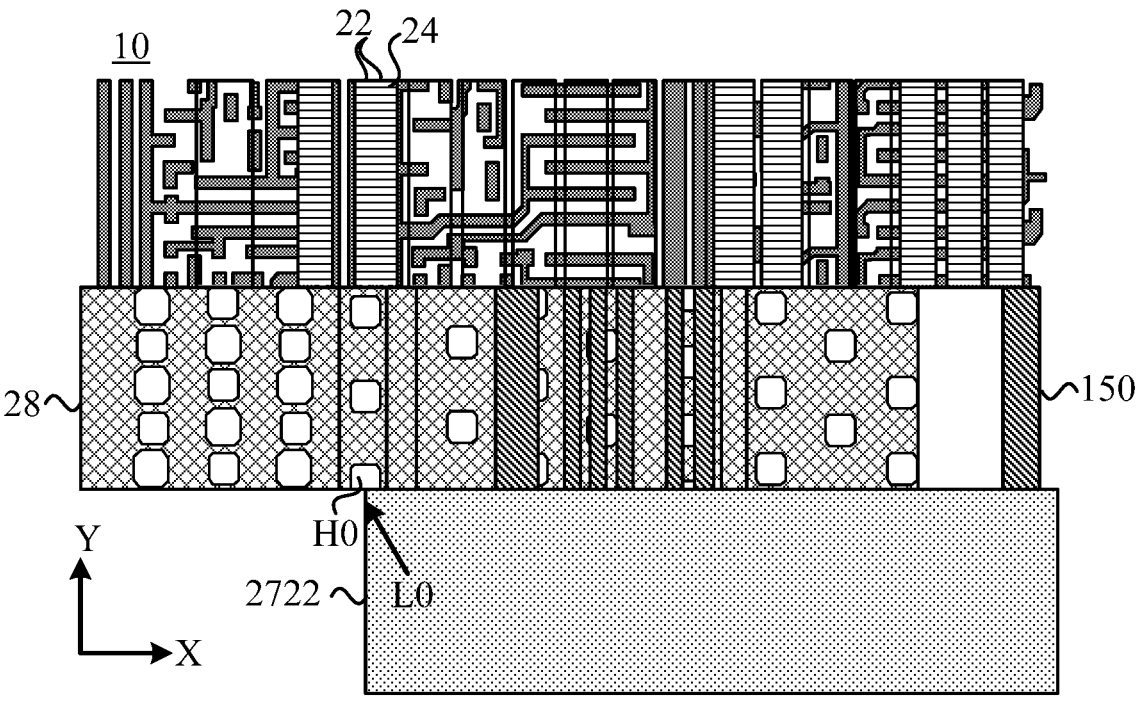
FIG. 21 is a structure diagram of the layer stack of another display panel provided by an embodiment of the present disclosure.
Figure 22:
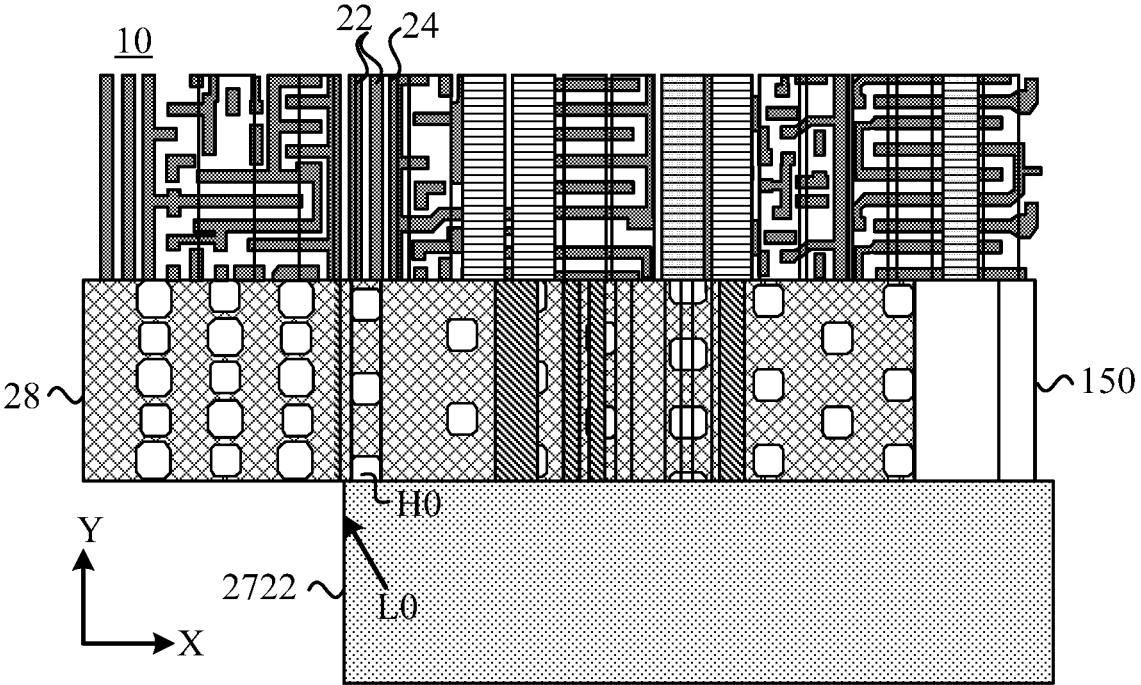
FIG. 22 is a structure diagram of the layer stack of another display panel provided by an embodiment of the present disclosure.

In some embodiments, FIG. 21 is a structure diagram of the layer stack of another display panel provided by an embodiment of the present disclosure, and FIG. 22 is a structure diagram of the layer stack of another display panel provided by an embodiment of the present disclosure. Both figures show the layer-disassembled structure of the display panel with three sets of layers. Referring to FIG. 21 or FIG. 22, the touch electrode signal line 24 and the clock signal line 22 at least partially overlap in the thickness direction of the display panel 10.

Illustratively, in FIG. 21 or 22, with the orientation illustrated in the figure as an example, the layer where the touch electrode signal line 24 is located and the layer where the clock signal line 22 is located are in the uppermost layer. With the patterned arrangement of the layer, one layer includes the touch electrode signal line 24, and another layer includes the clock signal line 22; in the thickness direction of the display panel 10, the touch electrode signal line 24 and the clock signal line 22 at least partially overlap. In this manner, the wiring space is saved, and the plane size of the display panel 10 is reduced, thereby achieving the miniaturization design.

In some embodiments, still referring to FIG. 22, the power lead 28 has a via H0, and the second electrode 2722 is configured to completely cover the via H0 of the power lead 28 between the touch electrode signal line 24 and the clock signal line 22.

The boundary L0 of the second electrode 2722 is located on the left side of the left boundary of the via H0 in the first direction X so that the second electrode 2722 can completely cover the via H0 of the power lead 28 between the touch electrode signal line 24 and the clock signal line 22, thereby avoiding the direct coupling between the touch electrode signal line 24 and the clock signal line 22 and reducing the coupling interference between the touch electrode signal line 24 and the clock signal line 22.

In some embodiments, as shown in FIG. 22, the display panel 10 may further include an auxiliary metal layer 150. The auxiliary metal layer 150 is located between the touch electrode signal line 24 and the clock signal line 22, and the auxiliary metal layer 150 may completely cover the via H0 of the power lead 28 between the touch electrode signal line 24 and the clock signal line 22, thereby avoiding the direct coupling between the touch electrode signal line 24 and the clock signal line 22 and reducing the coupling interference between the touch electrode signal line 24 and the clock signal line 22.

In other implementations, the display panel 10 may further include other metal layers located between the touch electrode signal line 24 and the clock signal line 22. At least one of the other metal layers is patterned to enable the patterned layer to completely cover the via H0 of the power lead 28 between the touch electrode signal line 24 and the clock signal line 22, thereby avoiding the direct coupling between the touch electrode signal line 24 and the clock signal line 22 and reducing the coupling interference between the touch electrode signal line 24 and the clock signal line 22.

Figure 23:
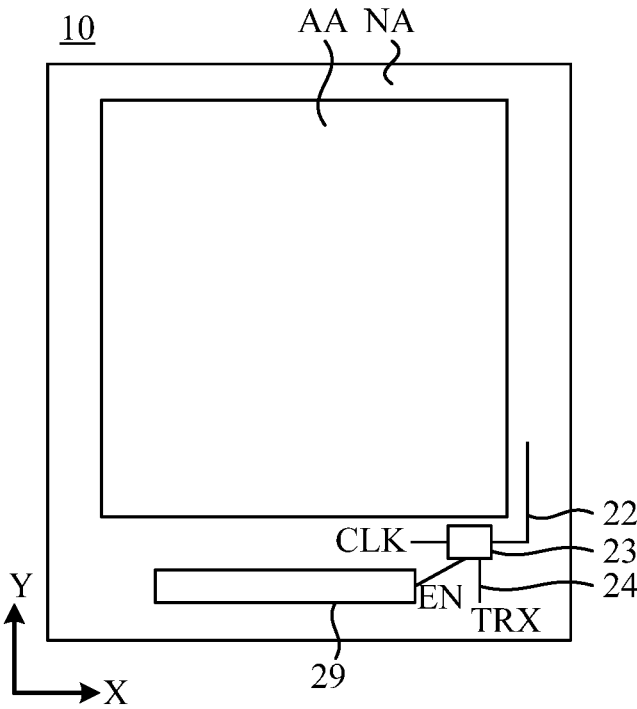
FIG. 23 is a structure diagram of another display panel provided by an embodiment of the present disclosure.

In some embodiments, FIG. 23 is a structure diagram of another display panel provided by an embodiment of the present disclosure. Referring to FIG. 23, the display panel 10 may further include a display driver integrated circuit (DDIC) 29 in the non-display region NA, and the clock signal input terminal of the scan signal drive module 23 is coupled to the DDIC 29 to receive the control signal.

The DDIC 29 is a chip for driving the display panel 10 to perform image display. Illustratively, the DDIC 29 includes a general-purpose input/output (GPIO) port, and the control terminal of the gating module 23 is connected to the GPIO port of the DDIC.

In the embodiments of the present disclosure, the DDIC 29 can transmit the control signal EN to the gating module 23, and in response to the switching of high and low levels of the control signal EN, the gating module 23 performs the switching of the clock signal or the touch electrode drive signal transmitted on the clock signal line 22 in the display stage or the touch stage within a frame time, thereby achieving signal synchronization, reducing coupling interference, and improving touch accuracy. Moreover, an output signal of the DDIC 29 is directly used as the control signal, thereby avoiding the setting of additional circuit structures and reducing the number of wires.

In some embodiments, still referring to FIG. 23, the gating module 23 is located between the DDIC 29 and the display region AA. Illustratively, the gating module 23 may be located in a fan-out region.

The control terminal of the gating module 23 is connected to the DDIC 29, the output terminal is connected to the clock signal line 22, the clock signal line 22 may be located in the non-display region NA on at least one side of the display region AA in the first direction X, and the DDIC 29 is located in the non-display region NA on the lower side of the display region AA in the second direction Y. By setting the gating module 23 to be located between the DDIC 29 and the display region AA in the second direction Y, the signal lines corresponding to the control terminal and the output terminal of the gating module 23 can be shortened, thereby facilitating the wiring design, reducing the wiring difficulty, and simplifying the wiring structure.

In some embodiments, the touch electrode drive signal includes a sense electrode drive signal.

The sense electrode drive signal is a signal generated by a sense electrode in response to a touch action and is used for carrying the relevant information of the touch action. By processing and parsing the sense electrode drive signal, the touch intention of the user can be obtained so that the display panel performs the corresponding action in response to the touch intention of the user.

The touch principle may be self-capacitive touch or mutual capacitive touch, which is not limited thereto.

Illustratively, the sense electrode drive signal herein may be represented by RX. In other implementations, the touch electrode drive signal may further include a transmit electrode drive signal TX, and the clock signal line may also synchronously transmit the transmit electrode drive signal TX when the display panel is in the touch stage, which is not limited thereto.

In the display panel 10 provided by the embodiments of the present disclosure, the clock signal line 22 can transmit the sense electrode drive signal in the touch stage T02, thereby avoiding the coupling interference between the clock signal line 22 and the sense electrode drive signal and improving touch accuracy.

In some embodiments, the number of touch electrode signal lines used for transmitting the sense electrode drive signal is greater than the number of touch electrode signal lines used for transmitting the transmit electrode drive signal. Therefore, by setting the touch electrode drive signal as the sense electrode drive signal, the overall structure of the display panel and the driving method are still simple while the coupling interference is reduced.

On the basis of the preceding implementations, the embodiments of the present disclosure further provide a display device. The display device may include the display panel provided by any of the preceding implementations and can achieve the corresponding beneficial effects. For details, reference may be made to the above description, and the details are not repeated herein.

Figure 24:
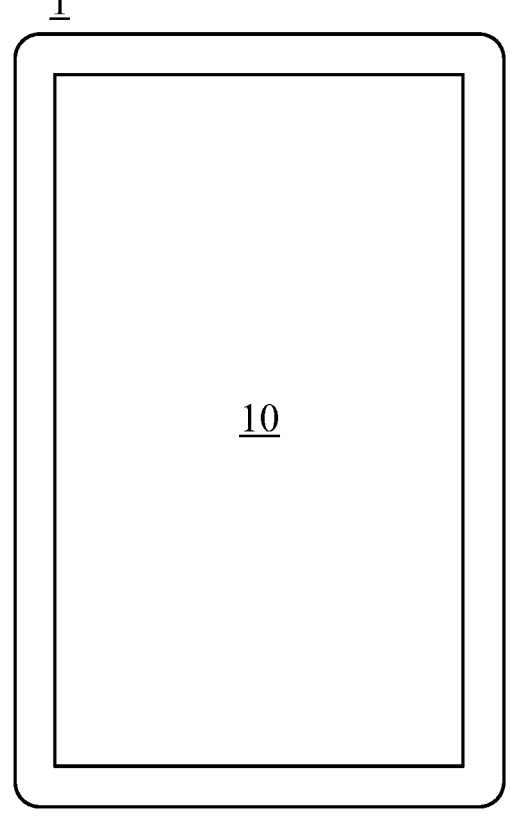
FIG. 24 is a structure diagram of a display device provided by an embodiment of the present disclosure.

Illustratively, FIG. 24 is a structure diagram of a display panel provided by an embodiment of the present disclosure. As shown in FIG. 24, the display device 1 may include the display panel 10 provided by any of the preceding implementations and has corresponding beneficial effects. To avoid repeated description, the details are not repeated herein.

Illustratively, the display device 1 may include, but is not limited to, a mobile phone, a tablet computer, an in-vehicle computer, an intelligent wearable device having a display function, and other structural components having a display function. The details are not repeated herein, nor are they limited.

In some embodiments, FIG. 25 is a structure diagram of another display device provided by an embodiment of the present disclosure. Referring to FIG. 25, the display panel 1 may further include a touch panel driver integrated circuit (TPIC) 11, and the control terminal of the gating module 23 is coupled to the TPIC 11 to receive the control signal.

The TPIC 11 is used for acquiring a touch operation signal (for example, the sense electrode drive signal) on the display panel. Illustratively, the TPIC 11 includes a GPIO port, and the control terminal of the gating module 23 is connected to the GPIO port of the TPIC.

In the embodiments of the present disclosure, the TPIC 11 can transmit the control signal EN to the gating module 23, and in response to the switching of high level and low level of the control signal EN, the gating module 23 performs the switching of the clock signal or the touch electrode drive signal transmitted on the clock signal line 22 in the display stage or the touch stage within a frame time, thereby achieving signal synchronization, reducing coupling interference, and improving touch accuracy. At the same time, one outputted signal of the TPIC 11 is directly used as the control signal, thereby avoiding the setting of additional circuit structures and reducing the number of wires.

Illustratively, as shown in FIG. 25, the GPIO port of the TPIC is connected to the GPIO port of the DDIC, and both the GPIO ports are connected to the control terminal of the gating module 23 for supplying the control signal EN. Therefore, the gating of the display stage and the touch control stage can be achieved through the existing control signal EN without increasing additional gate signals, thereby reducing the increase of the wires and reducing the impact on other circuits/devices in the display device.

Based on the same concept, the embodiments of the present disclosure further provide a driving method. The driving method is implemented based on a gating module and is applied to the scan signal driver circuit, display panel or display device provided by any of the preceding implementations to achieve the synchronous transmission of the touch electrode drive signal on the clock signal line in the touch stage, thereby avoiding the coupling interference of the clock signal to the touch electrode drive signal and improving touch accuracy.

Illustratively, FIG. 26 is a flowchart of a driving method provided by an embodiment of the present disclosure. Referring to FIG. 26, the driving method may include step S50.

In S50, in a touch stage, a control terminal of the gating module receives a control signal, wherein the control signal is used for instructing an output terminal of the gating module to be coupled to a second input terminal of the gating module, and the output terminal of the gating module outputs a touch electrode drive signal to a clock signal line such that the clock signal line receives the touch electrode drive signal.

In conjunction with FIG. 2, the gating module 23 includes the control terminal 230, a first input terminal 231, the second input terminal 232, and the output terminal 233, the control terminal 230 is configured to receive the control signal, the first input terminal 231 is configured to receive a clock signal, the second input terminal 232 is configured to receive the touch electrode drive signal, and the output terminal 233 is connected to the clock signal line.

Further, in conjunction with FIG. 3 or 4, a frame time T0 of the display panel 10 includes a display stage T01 and a touch stage T02. In the touch stage T02, the control terminal 230 of the gating module 23 receives the control signal, where the control signal is used for instructing the output terminal 233 of the gating module 23 to be coupled to the second input terminal 232 of the gating module 23, and the output terminal of the gating module outputs the touch electrode drive signal to a clock signal line such that the clock signal line 22 receives the touch electrode drive signal.

The driving method provided by the embodiments of the present disclosure is implemented based on the gating module. Specifically, by coupling the second input terminal of the gating module to the output terminal in the touch stage, the clock signal line receives the touch electrode drive signal, that is, the clock signal line and the touch wire can synchronously transmit the touch electrode drive signal, thereby avoiding the coupling interference of the clock signal to the touch electrode drive signal and improving touch accuracy.

In some embodiments, FIG. 27 is a flowchart of another driving method provided by an embodiment of the present disclosure and shows an additional step of the driving method shown in FIG. 26. Referring to FIG. 27, the driving method may further include step S60.

In S60, in a display stage, the control terminal of the gating module receives the control signal, wherein the control signal is used for instructing the output terminal of the gating module to be coupled to the first input terminal of the gating module, and the output terminal of the gating module outputs the clock signal to the clock signal line such that the clock signal line receives the clock signal.

Still referring to FIG. 3 or 4, in the display stage T01, the clock signal line maintains the original cycle frequency associated with the image display, thereby avoiding the display stage being affected and ensuring the display effect.

Illustratively, still referring to FIG. 3 or 4, for a frame time T0 of the display panel 10, the control signal EN includes a first level and a second level; when the control signal EN is at the first level, the display panel 10 is in the display stage T01; when the control signal EN is at the second level, the display panel 10 is in the touch stage T02.

With FIG. 3 as an example, when the display panel enter the touch stage, the control signal EN is pulled down, and the DDIC detects that the control signal EN is at the second level and controls the first transistor to be turned off and the second transistor to be turned on, that is, the gating module is controlled to gate the transmission path between the second input terminal and the output terminal, so that the clock signal is synchronized with the touch electrode drive signal, thereby canceling noise interference caused by coupling; when the display panel exits the touch stage for normal display, the control signal EN is pulled up, the DDIC detects that control signal EN is at the first level and controls the first transistor to be turned on and the second transistor to be turned off, that is, the gating module is controlled to gate the transmission path between the first input terminal and the output terminal, so as to normally transmit the clock signal is and normally display the images.

In some embodiments, since the coupling interference between touch and display is reduced, the touch accuracy is improved; based on this, in the sleep/wake-up scenario of the display panel, since the touch accuracy is high, the operation effectiveness of touch to wake up is improved.

In the driving method provided by the embodiments of the present disclosure, by coupling the second input terminal of the gating module to the output terminal in the touch stage, the clock signal line receives the touch electrode drive signal, that is, the clock signal line and the touch wire can synchronously transmit the touch electrode drive signal, thereby avoiding the coupling interference of the clock signal to the touch electrode drive signal and improving touch accuracy; in the display stage, the clock signal line maintains the original cycle frequency associated with the image display, thereby avoiding the display stage being affected and ensuring the display effect.

It is to be noted the relational terms herein such as "first" and "second" are merely used for distinguishing one entity or operation from another entity or operation, but do not necessarily require or imply any actual relationship or order between the entities or the operations. Moreover, the terms "comprise/comprising", "contain/containing" or any other variants thereof are intended to encompass a non-exclusive inclusion so that a process, method, object or device containing a series of elements includes not only these elements, but also other elements not listed clearly, or further includes inherent elements of the process, method, object or device. In the absence of more restrictions, the elements defined by the statement "including a . . . " do not exclude the presence of additional identical elements in the process, method, object or device that includes the elements.

The preceding are only specific embodiments of the present disclosure to enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure is not intended to be limited to these embodiments described herein, but is to be accorded with the widest scope consistent with the principles and features disclosed herein.

What is claimed is:

1. A scan signal driver circuit, located in a non-display region of a display panel and comprising:

a scan signal drive module, wherein a clock signal input terminal of the scan signal drive module is coupled to a clock signal line; and a gating module, wherein the gating module comprises a control terminal, a first input terminal, a second input terminal, and an output terminal, the control terminal is configured to receive a control signal, the first input terminal is configured to receive a clock signal, the second input terminal is configured to receive a touch electrode drive signal, and the output terminal is connected to the clock signal line;

wherein a frame time of the display panel comprises a display stage and a touch stage, wherein in the touch stage, the control signal received by the control terminal of the gating module is used for instructing the output terminal of the gating module to be coupled to the second input terminal of the gating module, the output terminal of the gating module is configured to output the touch electrode drive signal to the clock signal line;

wherein the gating module comprises a first transistor and a second transistor;

the control terminal of the gating module is coupled to a control electrode of the first transistor and a control electrode of the second transistor, the first input terminal of the gating module is coupled to a first electrode of the first transistor, the output terminal of the gating module is coupled to a second electrode of the first transistor and a first electrode of the second transistor, and the second input terminal of the gating module is coupled to a second electrode of the second transistor;

a channel type of the first transistor is different from a channel type of the second transistor.

2. The scan signal driver circuit according to claim 1, wherein the touch electrode drive signal comprises a sense electrode drive signal.

3. The scan signal driver circuit according to claim 1, wherein for the frame time of the display panel, the control signal comprises a first level and a second level;

in response to the control signal is at the first level, the display panel is in the display stage;

in response to the control signal is at the second level, the display panel is in the touch stage.

4. The scan signal driver circuit according to claim 1, wherein the first level is a high level, the second level is a low level, the first transistor is an n-type metal oxide semiconductor (NMOS) transistor, and the second transistor is a p-type metal oxide semiconductor (PMOS) transistor; or the first level is a low level, the second level is a high level, the first transistor is a PMOS transistor, and the second transistor is an NMOS transistor.

5. The scan signal driver circuit according to claim 1, wherein the scan signal drive module comprises a plurality of cascaded shift registers;

each of the plurality of shift registers comprises N clock signal input terminals configured to receive N clock signals, wherein N is a positive integer;

a number of the gating modules is an integer multiple of N.

6. The scan signal driver circuit according to claim 5, wherein the number of the gating modules is N, and clock signal input terminals, which are configured to receive a same clock signal, of the plurality of shift registers are coupled to a same gating module.

7. The scan signal driver circuit according to claim 5, wherein the number of the gating modules is N×M, M is a stage number of the plurality of shift registers, and clock signal input terminals of each of the plurality of shift registers are coupled to different gating modules, wherein M is a positive integer.

8. A display panel, comprising a display region and a non-display region at least partially surrounding the display region, wherein the display panel comprises a touch electrode signal line, a clock signal line and a gating module in the non-display region;

wherein the gating module comprises a control terminal, a first input terminal, a second input terminal, and an output terminal, the control terminal is configured to receive a control signal, the first input terminal is configured to receive a clock signal, the second input terminal is coupled to the touch electrode signal line to receive a touch electrode drive signal, and the output terminal is coupled to the clock signal line;

wherein a frame time of the display panel comprises a display stage and a touch stage, wherein in the touch stage, the control signal received by the control terminal of the gating module is used for instructing the output terminal of the gating module to be coupled to the second input terminal of the gating module, the output terminal of the gating module is configured to output the touch electrode drive signal to the clock signal line;

wherein the gating module comprises a first transistor and a second transistor;

the control terminal of the gating module is coupled to a control electrode of the first transistor and a control electrode of the second transistor, the first input terminal of the gating module is coupled to a first electrode of the first transistor, the output terminal of the gating module is coupled to a second electrode of the first transistor and a first electrode of the second transistor, and the second input terminal of the gating module is coupled to a second electrode of the second transistor;

a channel type of the first transistor is different from a channel type of the second transistor.

9. The display panel according to claim 8, wherein for the frame time of the display panel, the control signal comprises a first level and a second level;

in response to the control signal is at the first level, the display panel is in the display stage; and in response to the control signal is at the second level, the display panel is in the touch stage.

10. The display panel according to claim 8, wherein the first level is a high level, the second level is a low level, the first transistor is an n-type metal oxide semiconductor (NMOS) transistor, and the second transistor is a p-type metal oxide semiconductor (PMOS) transistor; or the first level is a low level, the second level is a high level, the first transistor is a PMOS transistor, and the second transistor is an NMOS transistor.

11. The display panel according to claim 8, wherein the display panel further comprises a scan signal drive module in the non-display region;

wherein a clock signal input terminal of the scan signal drive module is coupled to the clock signal line.

12. The display panel according to claim 11, wherein the scan signal drive module comprises a plurality of cascaded shift registers;

each of the plurality of shift registers comprises N clock signal input terminals configured to receive N clock signals, wherein N is a positive integer;

a number of the gating modules is an integer multiple of N.

13. The display panel according to claim 12, wherein the number of the gating modules is N, and clock signal input terminals, which are configured to receive a same clock signal, of the plurality of shift registers are coupled to a same gating module; or the number of the gating modules is N×M, M is a stage number of the plurality of shift registers, and clock signal input terminals of each of the plurality of shift registers are coupled to different gating modules, wherein M is a positive integer.

14. The display panel according to claim 11, wherein the gating module and the said scan signal drive module are at least partially disposed in a same layer.

15. The display panel according to claim 8, wherein the display panel further comprises a display driver integrated circuit in the non-display region;

wherein the control terminal of the gating module is coupled to the display driver integrated circuit to receive the control signal.

16. The display panel according to claim 15, wherein the gating module is located between the display driver integrated circuit and the display region.

17. The display panel according to claim 8, wherein the touch electrode drive signal comprises a sense electrode drive signal.

18. A display device, comprising the display panel according to claim 8.

19. The display device according to claim 18, further comprising:

a touch panel driver integrated circuit, wherein the control terminal of the gating module is coupled to the touch panel driver integrated circuit to receive the control signal.

20. A driving method, implemented based on a gating module, wherein the gating module comprises a control terminal, a first input terminal, a second input terminal, and an output terminal, the control terminal is configured to receive a control signal, the first input terminal is configured to receive a clock signal, the second input terminal is configured to receive a touch electrode drive signal, and the output terminal is connected to a clock signal line; wherein the gating module comprises a first transistor and a second transistor;

the control terminal of the gating module is coupled to a control electrode of the first transistor and a control electrode of the second transistor, the first input terminal of the gating module is coupled to a first electrode of the first transistor, the output terminal of the gating module is coupled to a second electrode of the first transistor and a first electrode of the second transistor, and the second input terminal of the gating module is coupled to a second electrode of the second transistor;

a channel type of the first transistor is different from a channel type of the second transistor;

wherein the driving method comprising:

in a touch stage, receiving a control signal by the control terminal of the gating module, wherein the control signal is used for instructing the output terminal of the gating module to be coupled to the second input terminal of the gating module, and outputting by the output terminal of the gating module, the touch electrode drive signal to the clock signal line.

21. The driving method according to claim 20, further comprising:

in a display stage, receiving, the control signal by the control terminal of the gating module, wherein the control signal is used for instructing the output terminal of the gating module to be coupled to the first input terminal of the gating module, and outputting by the output terminal of the gating module, the clock signal to the clock signal line.

22. A display panel, comprising a display region and a non-display region at least partially surrounding the display region, wherein the display panel comprises a touch electrode signal line, a clock signal line and a gating module in the non-display region;

wherein the gating module comprises a control terminal, a first input terminal, a second input terminal, and an output terminal, the control terminal is configured to receive a control signal, the first input terminal is configured to receive a clock signal, the second input terminal is coupled to the touch electrode signal line to receive a touch electrode drive signal, and the output terminal is coupled to the clock signal line;

wherein a frame time of the display panel comprises a display stage and a touch stage, wherein in the touch stage, the control signal received by the control terminal of the gating module is used for instructing the output terminal of the gating module to be coupled to the second input terminal of the gating module, the output terminal of the gating module is configured to output the touch electrode drive signal to the clock signal line;

wherein the display panel further comprises a pixel circuit and a light-emitting element in the display region and a power lead in the non-display region; a first electrode of the light-emitting element is connected to the pixel circuit, a second electrode of the light-emitting element is configured to extend from the display region to the non-display region and is coupled to the power lead, and the power lead and the first electrode are disposed in a same layer;

the touch electrode signal line and the clock signal line are located on two opposed sides of the power lead;

the gating module and the pixel circuit are at least partially disposed in a same layer.

23. The display panel according to claim 22, wherein the touch electrode signal line and the clock signal line at least partially overlap in a thickness direction of the display panel.

24. The display panel according to claim 22, wherein the power lead has a via, and the second electrode is configured to completely cover the via of the power lead between the touch electrode signal line and the clock signal line.

* * * * *